United States Patent
Yu et al.

(10) Patent No.: US 12,283,852 B2
(45) Date of Patent: Apr. 22, 2025

(54) TWISTING DEVICE OF HAIR PIN TYPE STATOR COIL

(71) Applicants: Hyundai Motor Company, Seoul (KR); Kia Corporation, Seoul (KR)

(72) Inventors: Yeongsu Yu, Busan (KR); Jeong Hyeon Kim, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 166 days.

(21) Appl. No.: 17/813,718

(22) Filed: Jul. 20, 2022

(65) Prior Publication Data
US 2023/0070121 A1    Mar. 9, 2023

(30) Foreign Application Priority Data
Sep. 3, 2021    (KR) .................. 10-2021-0117842

(51) Int. Cl.
*H02K 15/36*    (2025.01)
*B21F 3/02*    (2006.01)

(52) U.S. Cl.
CPC ............ *H02K 15/36* (2025.01); *B21F 3/02* (2013.01)

(58) Field of Classification Search
CPC ..................... H02K 15/0087; H02K 15/36
See application file for complete search history.

(56) References Cited

FOREIGN PATENT DOCUMENTS

| DE | 102019124488 A1 | * | 3/2021 | ......... H02K 15/0087 |
| JP | 2003259613 A | * | 9/2003 | |
| WO | 2020127718 A1 | | 6/2020 | |

* cited by examiner

*Primary Examiner* — Livius R. Cazan
(74) *Attorney, Agent, or Firm* — MCDONNELL BOEHNEN HULBERT & BERGHOFF LLP

(57) ABSTRACT

Provided is a twisting device of a hair pin-type stator coil. The twisting device of a hair pin-type stator coil, which is to twist-form a plurality of hair pin-type stator coils inserted as a plurality of layers in a stator core, includes i) a base frame, ii) a coil fixing unit installed on the base frame through a plurality of support rods, iii) a twisting tool unit allowing a plurality of stator coils of two adjacent layers, among the plurality of layers, to be inserted thereinto, the two layers being rotated in different directions, and installed to be movable up and down in the base frame on a lower side of the coil fixing unit, iv) a tool driving unit installed on the base frame and operatively connected to the twisting tool unit.

20 Claims, 19 Drawing Sheets

(a)

(b)

FIG. 19A
FIG. 19B
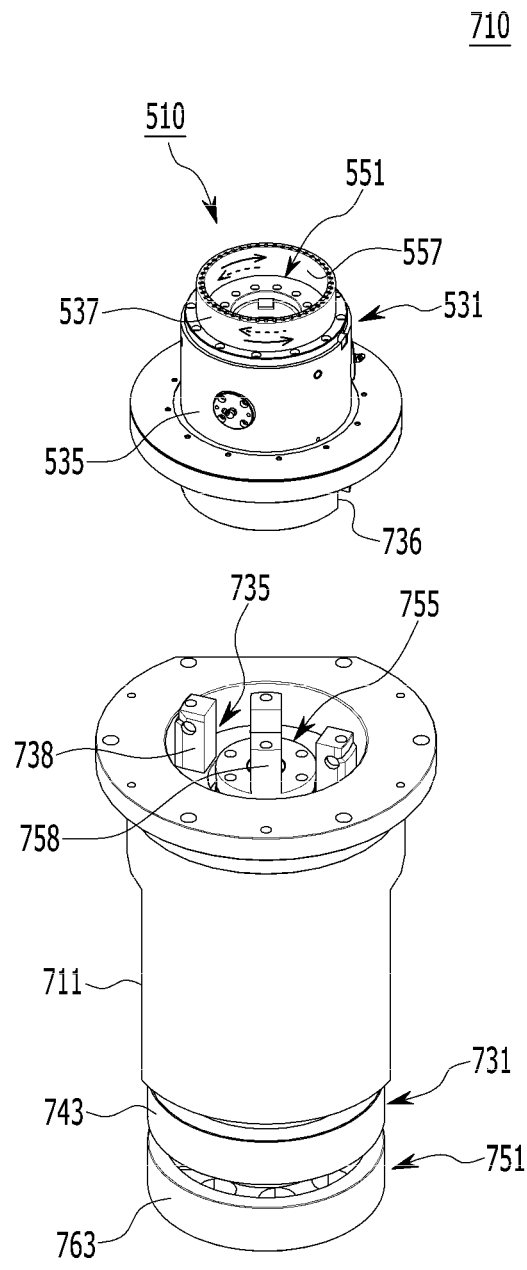
(a)
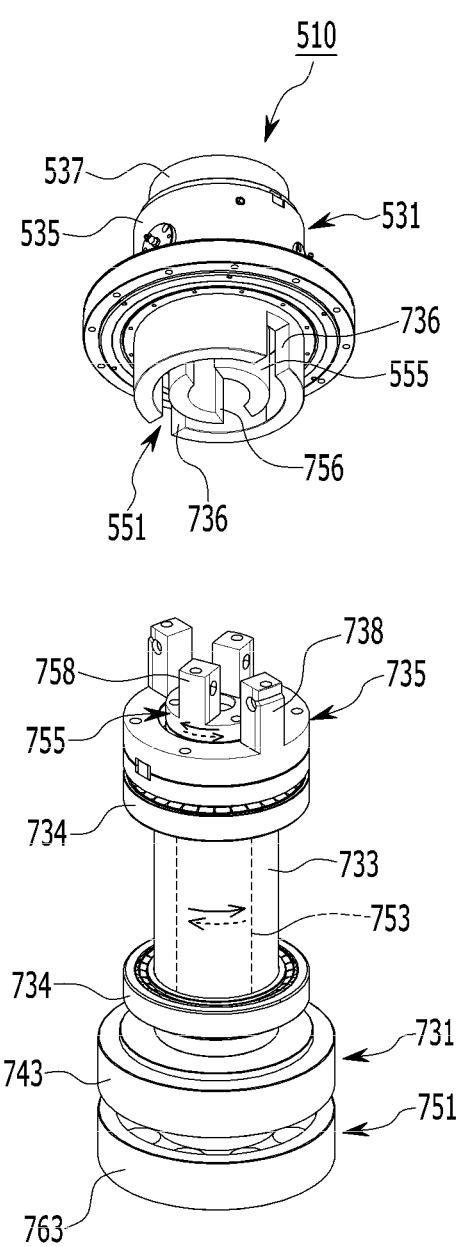
(b)

TWISTING DEVICE OF HAIR PIN TYPE STATOR COIL

CROSS-REFERENCE TO RELATED APPLICATIONS

This application claims priority to and the benefit of Korean Patent Application No. 10-2021-0117842 filed in the Korean Intellectual Property Office on Sep. 3, 2021, the entire contents of which are incorporated herein by reference.

TECHNICAL FIELD

The present disclosure relates to a hair pin winding type stator manufacturing system, and more particularly, to a twisting device of a hair pin-type stator coil configured to twist-form a plurality of hair pin-type stator coils inserted in a stator core.

BACKGROUND

In general, hybrid vehicles or electric vehicles called eco-friendly vehicles adopt technology for generating a driving force by a driving motor.

In order to reduce the weight and volume of vehicles and parts, automobile manufacturers and eco-friendly parts manufacturers have applied drive motors having a stator with a hair pin-type stator coil wound thereon.

The stator is manufactured through a process of inserting a plurality of hair pin-type stator coils (hereinafter, referred to as 'a plurality of stator coils' for convenience) into a plurality of slots of a stator core and a process of welding the plurality of stator coils inserted in the plurality of slots.

Meanwhile, before the welding process of the plurality of stator coils, a coil widening process of widening a distance between welded portions of the plurality of stator coils and a coil twisting process of twist-forming the widened welded portions are performed.

Among them, in the coil twisting process, welded portions are twist-formed for each layer of a plurality of stator coils using a coil twisting device. Such a coil twisting device has been developed to have an advantageous structure in terms of lowering equipment cost and maintenance.

The above information disclosed in this Background section is only for enhancement of understanding of the background of the present disclosure, and therefore it may contain information that does not form the prior art that is already known in this country to a person of ordinary skill in the art.

SUMMARY

The present disclosure has been made in an effort to provide a twisting device of a hair pin-type stator coil having advantages of twist-forming welded portions of a plurality of stator coils inserted into a stator core in a simple configuration.

According to an exemplary embodiment of the present disclosure, a twisting device of a hair pin-type stator coil, which is to twist-form a plurality of hair pin-type stator coils inserted as a plurality of layers in a stator core, includes: i) a base frame; ii) a coil fixing unit installed on the base frame through a plurality of support rods, iii) a twisting tool unit allowing a plurality of stator coils of two adjacent layers, among the plurality of layers, to be inserted thereinto, the two layers being rotated in different directions, and installed to be movable up and down in the base frame on a lower side of the coil fixing unit; iv) a tool driving unit installed on the base frame and operatively connected to the twisting tool unit.

In addition, in the twisting device of a hair pin-type stator coil according to an exemplary embodiment of the present disclosure, the coil fixing unit may include a plurality of coil fixing members operatively connected to an actuator installed on the base frame and radially reciprocating by the actuator.

In addition, in the twisting device of a hair pin-type stator coil according to an exemplary embodiment of the present disclosure, the coil fixing unit may include a coil guide passage formed between the plurality of coil fixing members to fix the plurality of stator coils in a layer direction.

In addition, in the twisting device of a hair pin-type stator coil according to an exemplary embodiment of the present disclosure, the coil fixing unit may include a support disk disposed to be spaced apart from an upper surface of the base frame through the plurality of support rods with the twisting tool unit on an inner side, a slot disk rotatably coupled to the support disk, a guide disk fixed to the support disk with the slot disk at a lower side, a plurality of coil fixing members radially slidably coupled to the guide disk, a plurality of cam lobes fixed to the plurality of coil fixing members and coupled to the slot disk through the guide disk, and an actuator installed on the base frame and connected to the slot disk.

In addition, in the twisting device of a hair pin-type stator coil according to an exemplary embodiment of the present disclosure, the support disk may include a plurality of cam follower rail grooves radially formed on an upper surface of the support disk.

In addition, in the twisting device of a hair pin-type stator coil according to an exemplary embodiment of the present disclosure, the slot disk may include a plurality of cam follower slots formed in a cyclone shape.

In addition, in the twisting device of a hair pin-type stator coil according to an exemplary embodiment of the present disclosure, the guide disk may include a plurality of guide rails radially formed on an upper surface thereof, and a plurality of guide rail holes formed between the plurality of guide rails.

In addition, in the twisting device of a hair pin-type stator coil according to an exemplary embodiment of the present disclosure, the plurality of cam lobes may vertically penetrate through the plurality of guide rail holes and the plurality of cam follower slots to be coupled to the plurality of cam follower rail grooves.

In addition, in the twisting device of a hair pin-type stator coil according to an exemplary embodiment of the present disclosure, the actuator may include a working cylinder installed on a mounting block mounted on the base frame and operably connected to an extension extending outwardly from an edge of the slot disk, a rail block fixed to the mounting block, a sliding block connected to the working rod of the working cylinder and slidably coupled to the rail block, and a fixing pin fixed to the sliding block and penetrating through the extension up and down.

In addition, in the twisting device of a hair pin-type stator coil according to an exemplary embodiment of the present disclosure, each of the plurality of coil fixing members may include a guide arm slidably coupled to the plurality of guide rails and a guide finger integrally connected to the guide arm to fix the plurality of stator coils in the layer direction.

In addition, in the twisting device of a hair pin-type stator coil according to an exemplary embodiment of the present disclosure, the twisting tool unit may include a lifting member movably coupled to the plurality of support rods in a vertical direction, a cylindrical outer twisting jig rotatably coupled to the lifting member and having a plurality of first coil insertion grooves formed to be spaced apart from each other in a circumferential direction, and a cylindrical inner twisting jig rotatably installed on an inner side of the outer twisting jig in a direction opposite to a rotation direction of the outer twisting jig, and having a plurality of second coil insertion grooves formed to be spaced apart from each other in the circumferential direction.

In addition, in the twisting device of a hair pin-type stator coil according to an exemplary embodiment of the present disclosure, the outer twisting jig and the inner twisting jig may be coupled to each other so as to be moved in a vertical direction by the lifting member.

In addition, in the twisting device of a hair pin-type stator coil according to an exemplary embodiment of the present disclosure, the twisting tool unit may further include a cam follower fixed to the outer twisting jig and coupled to at least one cam slot formed to be inclined in the circumferential direction on the inner twisting jig.

In addition, in the twisting device of a hair pin-type stator coil according to an exemplary embodiment of the present disclosure, the outer twisting jig may be moved in a vertical direction by a set inclination angle of the at least one cam slot by the cam follower.

In addition, in the twisting device of a hair pin-type stator coil according to an exemplary embodiment of the present disclosure, the outer twisting jig may include a first crown member in which the plurality of first coil insertion grooves are formed on an inner circumferential surface in a vertical direction.

In addition, in the twisting device of a hair pin-type stator coil according to an exemplary embodiment of the present disclosure, the inner twisting jig may include a second crown member in which the plurality of second coil insertion grooves are formed on an outer circumferential surface in a vertical direction.

In addition, in the twisting device of a hair pin-type stator coil according to an exemplary embodiment of the present disclosure, the inner circumferential surface of the first crown member and the outer circumferential surface of the second crown member may be in contact with each other, and the plurality of first coil insertion grooves and the plurality of second coil insertion grooves may face each other, respectively.

In addition, in the twisting device of a hair pin-type stator coil according to an exemplary embodiment of the present disclosure, the outer twisting jig may include a first edge protrusion formed at an open end of the plurality of first coil insertion grooves.

In addition, in the twisting device of a hair pin-type stator coil according to an exemplary embodiment of the present disclosure, the inner twisting jig may include a second edge protrusion formed at an open end of the plurality of second coil insertion grooves.

In addition, in the twisting device of a hair pin-type stator coil according to an exemplary embodiment of the present disclosure, the tool driving unit may include a housing fixed to the base frame, a first jig operating unit including an outer shaft rotatably installed inside the housing and operably connected to the outer twisting jig through the outer shaft, and a second jig operating unit including an inner shaft rotatably installed inside the outer shaft and operably connected to the inner twisting jig through the inner shaft.

In addition, in the twisting device of a hair pin-type stator coil according to an exemplary embodiment of the present disclosure, the tool driving unit may further include a lift driving unit installed in the housing and connected to the lifting member.

In addition, in the twisting device of a hair pin-type stator coil according to an exemplary embodiment of the present disclosure, the first jig operating unit may include a first key adaptor fixed to an upper end portion of the outer shaft and key-coupled to the outer twisting jig, a first servo motor installed in the housing, and a first power transmission mechanism including a first driving pulley connected to the first servo motor, a first driven pulley connected to the outer shaft, and a first belt connecting the first driving pulley to the second driven pulley.

In addition, in the twisting device of a hair pin-type stator coil according to an exemplary embodiment of the present disclosure, the second jig operating unit may include a second key adapter fixed to an upper end portion of the inner shaft and key-coupled to the inner twisting jig, a second servo motor installed in the housing, and a second power transmission mechanism including a second driving pulley connected to the second servo motor, a second driven pulley connected to the inner shaft, and a second belt connecting the second driving pulley to the second driven pulley.

In addition, in the twisting device of a hair pin-type stator coil according to an exemplary embodiment of the present disclosure, the first key adapter may include at least one first key coupled to at least one first key recess formed at a lower end of the outer twisting jig.

In addition, in the twisting device of a hair pin-type stator coil according to an exemplary embodiment of the present disclosure, the second key adapter may include at least one second key coupled to at least one second key recess formed at a lower end of the inner twisting jig.

In addition, in the twisting device of a hair pin-type stator coil according to an exemplary embodiment of the present disclosure, the lift driving unit may include a third servo motor installed in the housing and a nut block fixed to the lifting member and screw-coupled to a motor shaft of the third servo motor.

Exemplary embodiments of the present disclosure may simplify an overall structure, unlike a complicated structure in which welded portions of a plurality of stator coils of the entirety of a plurality of layers are twist-formed.

In addition, the effects obtainable or predicted by the exemplary embodiments of the present disclosure are disclosed directly or implicitly in the detailed description of the exemplary embodiments of the present disclosure. That is, various effects predicted according to exemplary embodiments of the present disclosure will be disclosed in the detailed description to be described later.

BRIEF DESCRIPTION OF THE DRAWINGS

Exemplary embodiments herein may be better understood by reference to the following description in connection with the accompanying drawings in which like reference signs refer to identical or functionally similar elements.

FIG. 19A is another perspective view illustrating a tool driving unit applied to a twisting device of a hair pin-type stator coil according to an exemplary embodiment of the present disclosure.

FIG. 19B is another perspective view illustrating a tool driving unit applied to a twisting device of a hair pin-type stator coil according to an exemplary embodiment of the present disclosure.

It is to be understood that the drawings referenced above are not necessarily drawn to scale, but rather present a rather simplified representation of various preferred features illustrating the basic principles of the present disclosure. Certain design features of the present disclosure, including, for example, particular dimensions, orientation, location, and shape, will be determined in part by the particular intended application and environment of use.

DETAILED DESCRIPTION

The terminology used herein is for the purpose of describing specific exemplary embodiments and is not intended to limit the present disclosure. As used herein, the singular forms are also intended to include the plural forms, unless the context clearly dictates otherwise. As used herein, it should be understood that the terms 'include and/or 'including' refer to the presence of specified features, integers, steps, operations, elements and/or components, but do not exclude the presence or addition of one or more other features, integers, steps, operations, components, and/or groups thereof. As used herein, the term 'coupled' denotes a physical relationship between two components directly connected to each other or indirectly connected through one or more intervening components.

Furthermore, as used herein, the term 'and/or' includes any one or all combinations of one or more of the associated listed items. And, 'operably connected' or similar terms mean that at least two members are directly or indirectly connected to each other to transmit power. However, two operatively connected members do not always rotate at the same speed and in the same direction.

Hereinafter, exemplary embodiments of the present disclosure will be described in detail with reference to the accompanying drawings.

Figure 1:
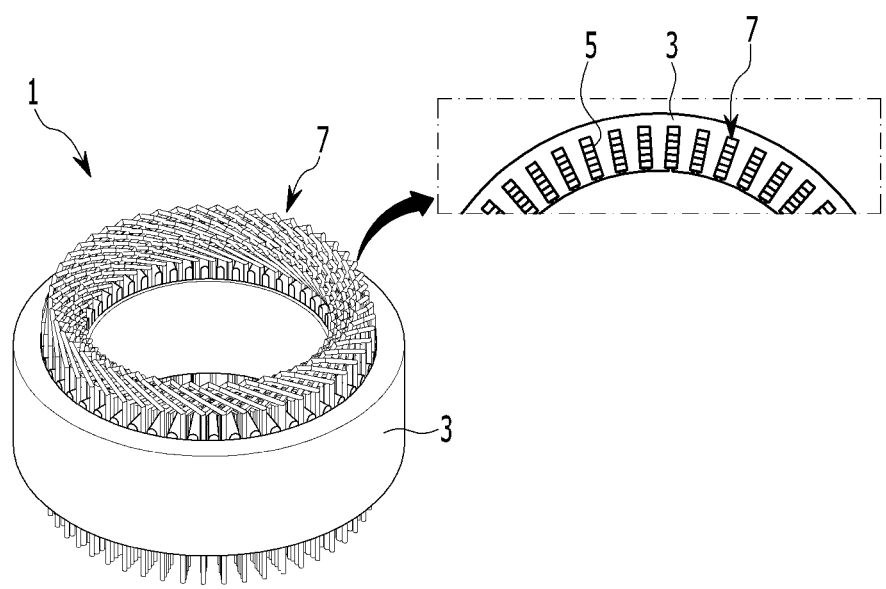
FIG. 1 is a diagram illustrating an example of a hair pin winding type stator applied to exemplary embodiments of the present disclosure.

FIG. 1 is a diagram illustrating an example of a hair pin winding type stator applied to exemplary embodiments of the present disclosure.

Referring to FIG. 1, the hair pin winding type stator 1 applied to the exemplary embodiments of the present disclosure may be applied to a driving motor for a hybrid vehicle and/or an electric vehicle as an eco-friendly vehicle that obtains driving force by electric energy.

The driving motor includes a stator 1 applied to the exemplary embodiments of the present disclosure and a rotor (not shown) disposed with a predetermined gap from the stator 1. In an example, the driving motor may include a permanent magnet synchronous motor (PMSM).

Here, the stator 1 includes a stator core 3 on which a plurality of electrical steel plates are stacked. The stator core 3 includes an outer diameter surface and an inner diameter surface and includes a plurality of slots 5 (e.g., 48 slots) formed radially in a radial direction.

In addition, the stator core 3 includes a plurality of stator coils 7 (commonly referred to as a 'segment coil' or a 'flat coil') wound around the plurality of slots 5.

Each of the plurality of stator coils 7 is provided in a hair pin type. In an example, each of the plurality of stator coils 7 may be provided as a V-shaped hair pin type. In another example, each of the plurality of stator coils 7 may be provided as a U-shaped or I-shaped hair pin type. Furthermore, each of the plurality of stator coils 7 may be provided as a prismatic coil having a square cross section.

Such a plurality of stator coils 7 are inserted into the plurality of slots 5 of the stator core 3 and welded to form a set electrical circuit.

As described above, the exemplary embodiments of the present disclosure have been described as being applied to a hair pin winding type stator of a driving motor for a vehicle, but it should be understood that the scope of the present disclosure is not necessarily limited thereto, and the technical idea of the present disclosure may be applied as long as it is a driving motor of various types and purposes employing a hair pin-type stator.

Figure 2:
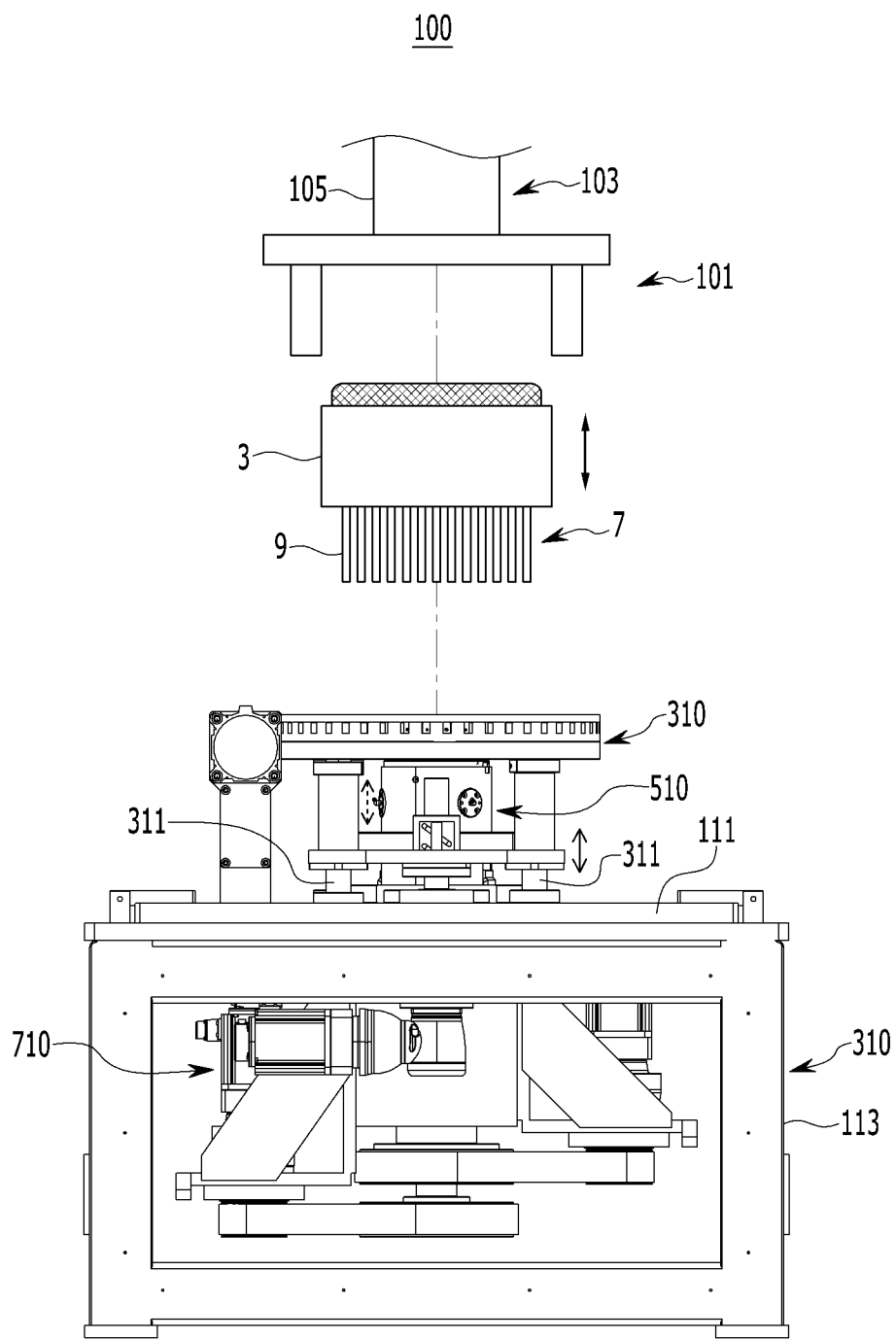
FIG. 2 is a front view illustrating a twisting device of a hair pin-type stator coil according to an exemplary embodiment of the present disclosure.

FIG. 2 is a front view illustrating a twisting device of a hair pin-type stator coil according to an exemplary embodiment of the present disclosure.

Referring to FIGS. 1 and 2, a twisting device 100 of a hair pin-type stator coil according to an exemplary embodiment of the present disclosure may be applied to a process of assembling the hair pin winding type stator 1, among the processes of assembling a driving motor.

Furthermore, the twisting device 100 of a hair pin-type stator coil according to an exemplary embodiment of the present disclosure may be applied to a process of post-treating a plurality of stator coils 7 inserted into the plurality of slots 5 of the stator core 3 in a coil inserting process. The coil post-treatment process may include a coil widening process, a coil twisting process, and a coil welding process.

The twisting device 100 of a hair pin-type stator coil according to an exemplary embodiment of the present disclosure may be applied to the coil twisting process among the post-treating processes. In the coil twisting process, a plurality of stator coils 7 widened in the coil widening process may be twisted using the twisting device 100 of a hair pin-type stator coil according to an exemplary embodiment of the present disclosure. The reason for twist-forming the plurality of stator coils 7 as described above is to align current movement paths of the plurality of stator coils 7.

Hereinafter, end portions of the plurality of stator coils 7 penetrating through the plurality of slots 5 of the stator core 3 are referred to as welded portions 9. The welded portions 9 of the plurality of stator coils 7 may be welded to each other in the coil welding process of the post-treating process.

In this specification, the arrangement direction of the plurality of stator coils 7 sequentially inserted into the plurality of slots 5 from the radially outer side to the inner side of the stator core 3 may be defined as a layer direction.

In this specification, a location point of the stator coil 7 located at the outermost side in a radial direction is referred to as a first layer. In addition, location points of the plurality of stator coils 7 sequentially located radially inward from the first layer may be referred to as second, third, fourth, fifth, and sixth layers.

Furthermore, in the present specification, 'upper end portion, 'upper portion, 'upper end or 'upper surface' of a component indicates an end portion, part, end, or surface of a component that is relatively above in the drawing, and 'lower end portion', 'lower portion', 'lower end' or 'lower surface' of a component indicates an end portion, part, end, or surface of a component that is relatively below in the drawing.

In addition, in the present specification, an end of a component (e.g., one end or the other end, etc.) indicates an end of the component in any one direction, and an end portion of a component (e.g., one end portion or the other end portion, etc.) indicates a certain portion of the component including the end.

Meanwhile, in the coil twisting process, in a state in which the stator core 3 is gripped by a core gripper 101, welded portions 9 of the plurality of stator coils 7 may be twist-formed by the twisting device 100 of a hair pin-type stator coil according to the exemplary embodiment of the present disclosure. Here, the core gripper 101 is mounted on a robot arm 105 of a robot 103 to move a programmed set trace.

The core gripper 101 is adapted to grip an outer diameter surface or an inner diameter surface of the stator core 3, and is rotatable with respect to the robot arm 105.

The robot 103 may use various robots 103 known to those of ordinary skill in the art so far.

The twisting device 100 of a hair pin-type stator coil according to an exemplary embodiment of the present disclosure may have a structure for twist-forming the welded portions 9 of the plurality of stator coils 7 inserted into the stator core 3 in a simple configuration.

Figure 3:
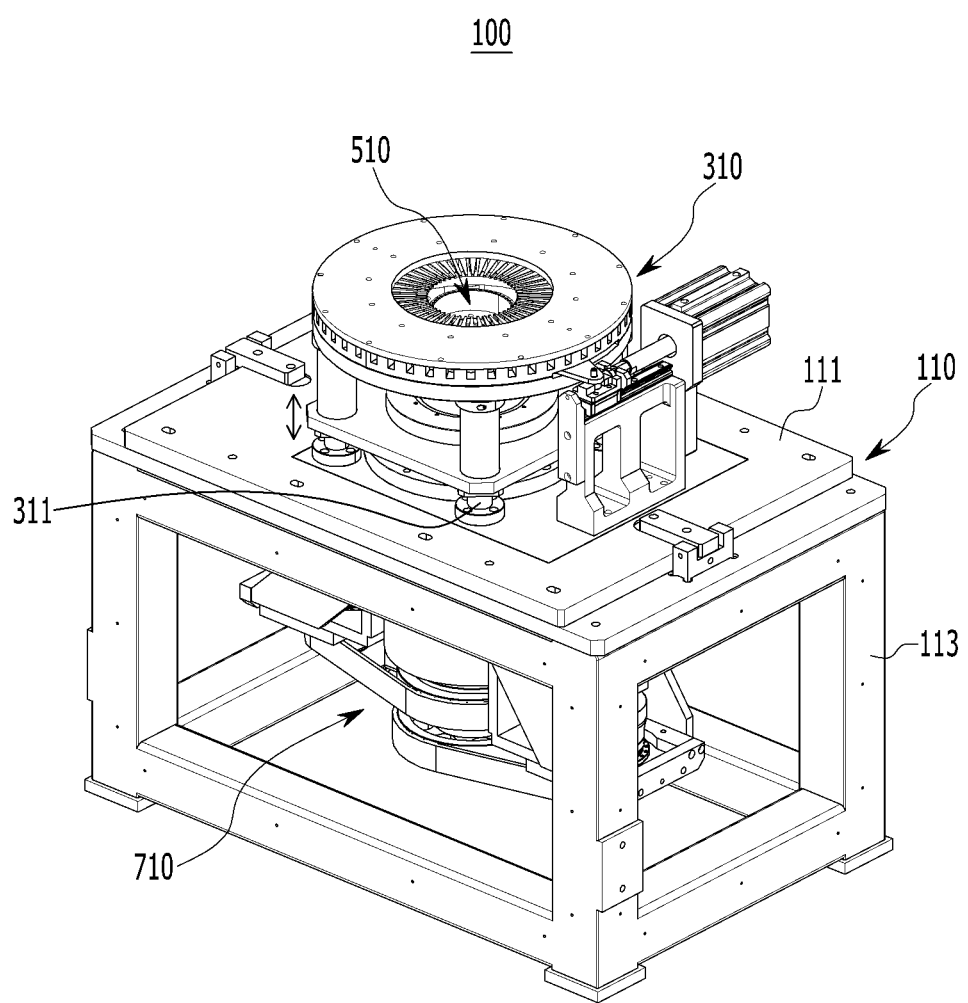
FIG. 3 is a perspective view illustrating a twisting device of a hair pin-type stator coil according to an exemplary embodiment of the present disclosure.
Figure 4:
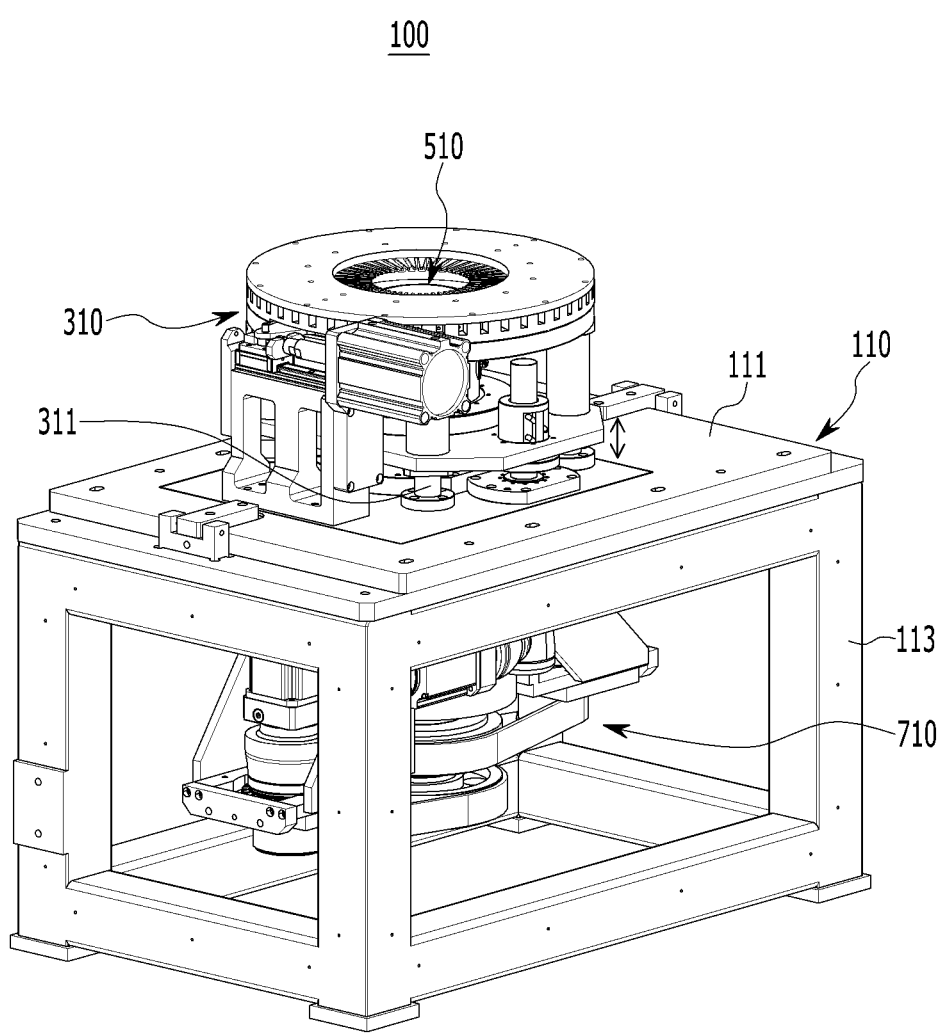
FIG. 4 is another perspective view illustrating a twisting device of a hair pin-type stator coil according to an exemplary embodiment of the present disclosure.

FIGS. 3 and 4 are perspective views illustrating a twisting device of a hair pin-type stator coil according to an exemplary embodiment of the present disclosure.

Referring to FIGS. 1 to 4, the twisting device 100 of a hair pin-type stator coil according to an exemplary embodiment of the present disclosure includes basically a base frame 110, a coil fixing unit 310, and a twisting tool unit 510, and a tool driving unit 710.

In an exemplary embodiment of the present disclosure, the base frame 110 is installed on the floor of the coil widening process workshop. Components to be described below are mounted on the base frame 110.

In an example, the base frame 110 includes a base plate 111 spaced upwardly from the floor of the process workshop. In addition, at least one support 113 coupled to a lower surface of the base plate 111 and extending downward is provided on the base frame 110.

In an exemplary embodiment of the present disclosure, the coil fixing unit 310 is configured to fix the plurality of stator coils 7 inserted into the plurality of slots 5 of the stator core 3 in the layer direction.

The coil fixing unit 310 is installed on the base frame 110 through a plurality of support rods 311. The plurality of support rods 311 are fixed to an upper surface of the base plate 111 and extend in a vertical direction from the upper surface. The coil fixing unit 310 is installed at an upper end portion of the plurality of support rods 311 and is spaced apart from the upper surface of the base plate 111.

Figure 5:
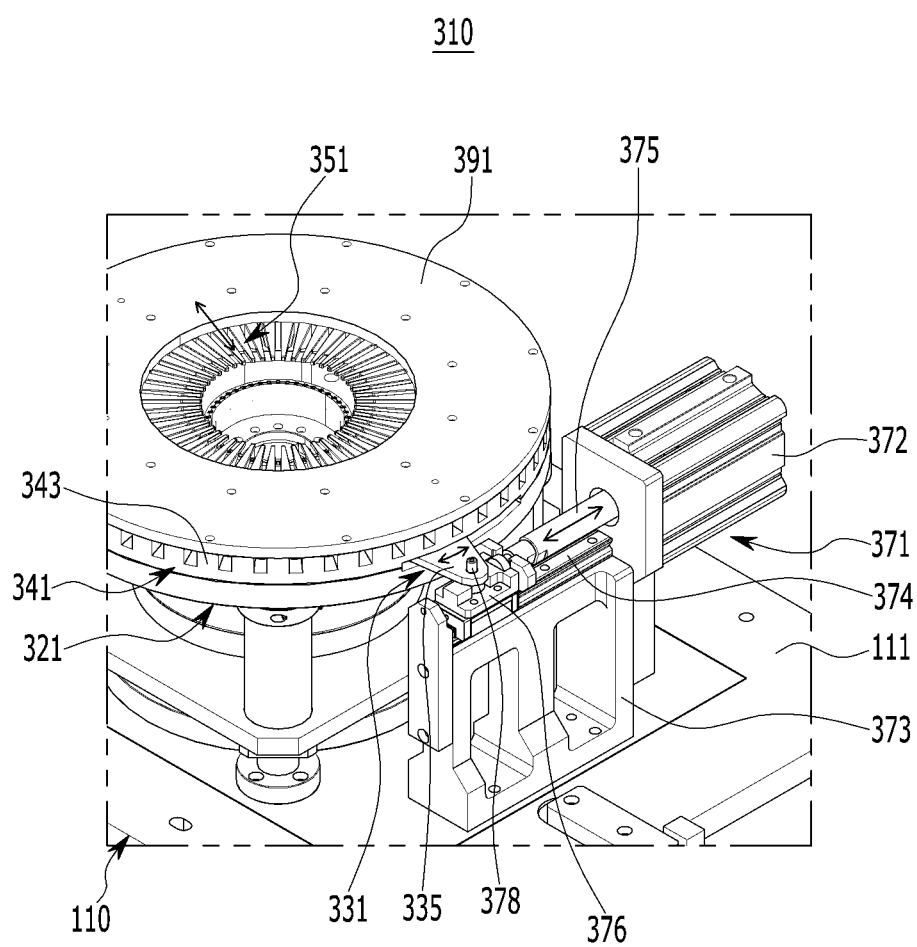
FIG. 5 is a combined perspective view illustrating a coil fixing unit applied to a twisting device of a hair pin-type stator coil according to an exemplary embodiment of the present disclosure.
Figure 6:
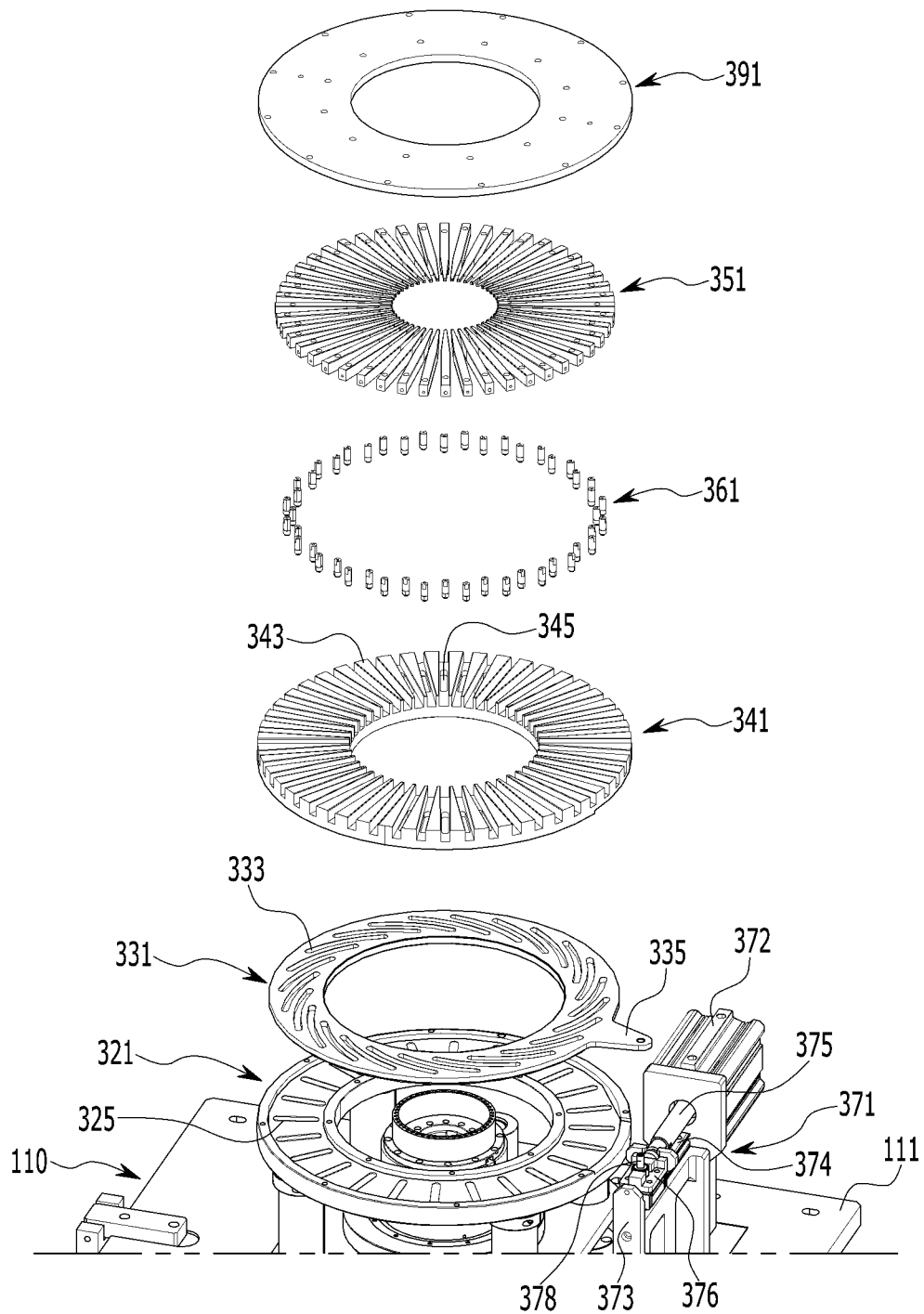
FIG. 6 is an exploded perspective view illustrating a coil fixing unit applied to a twisting device of a hair pin-type stator coil according to an exemplary embodiment of the present disclosure.

FIG. 5 is a combined perspective view illustrating a coil fixing unit applied to a twisting device of a hair pin-type stator coil according to an exemplary embodiment of the present disclosure, and FIG. 6 is an exploded perspective view showing a coil fixing unit applied to a twisting device of a hair pin-type stator coil according to an exemplary embodiment of the present disclosure.

Referring to FIGS. 5 and 6, the coil fixing unit 310 according to an exemplary embodiment of the present disclosure includes a support disk 321, a slot disk 331, a guide disk 341, a plurality of coil fixing members 351, a plurality of cam lobes 361, and an actuator 371.

The support disk 321 is provided as a disk plate in which a disk hole 323 is formed. The support disk 321 is fixed to an upper end of the plurality of support rods 311 and is disposed to be spaced apart from the upper surface of the base plate 111.

Figure 7:
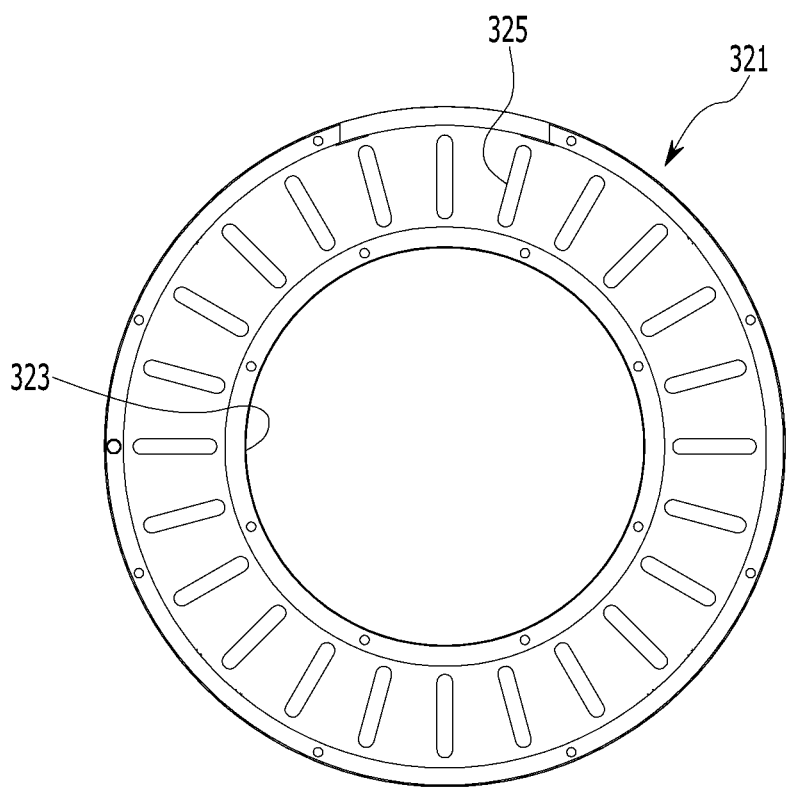
FIG. 7 is a plan view illustrating a support disk of a coil fixing unit applied to a twisting device of a hair pin-type stator coil according to an exemplary embodiment of the present disclosure.

As shown in FIG. 7, the support disk 321 includes a plurality of cam follower rail grooves 325 that are radially formed in the radial direction on the upper surface. The plurality of cam follower rail grooves 325 are formed in a straight line between an outer edge end and an inner edge end of the support disk 321.

The slot disk 331 is provided as a disk plate corresponding to a shape of the support disk 321. The slot disk 331 is disposed on an upper surface of the support disk 321, and is rotatably coupled to the support disk 321.

Figure 8:
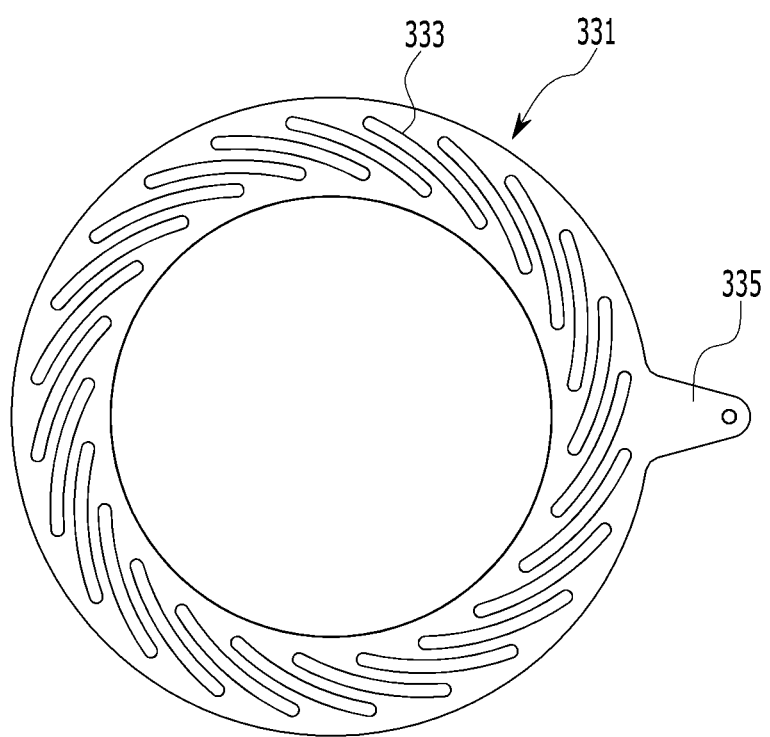
FIG. 8 is a plan view illustrating a slot disk of a coil fixing unit applied to a twisting device of a hair pin-type stator coil according to an exemplary embodiment of the present disclosure.

As shown in FIG. 8, the slot disk 331 includes a plurality of cam follower slots 333 formed in a cyclone shape. The plurality of cam follower slots 333 are formed as slot holes rounded from an inner edge end of the slot disk 331 toward an outer edge end. The plurality of cam follower slots 333 are vertically connected to the plurality of cam follower rail grooves 325 of the support disk 321.

The guide disk 341 is provided as a disk plate corresponding to the shapes of the support disk 321 and the slot disk 331. The guide disk 341 is fixed to the support disk 321 with the slot disk 331 at a lower side. That is, the slot disk 331 is rotatably disposed between the support disk 321 and the guide disk 341.

Figure 9:
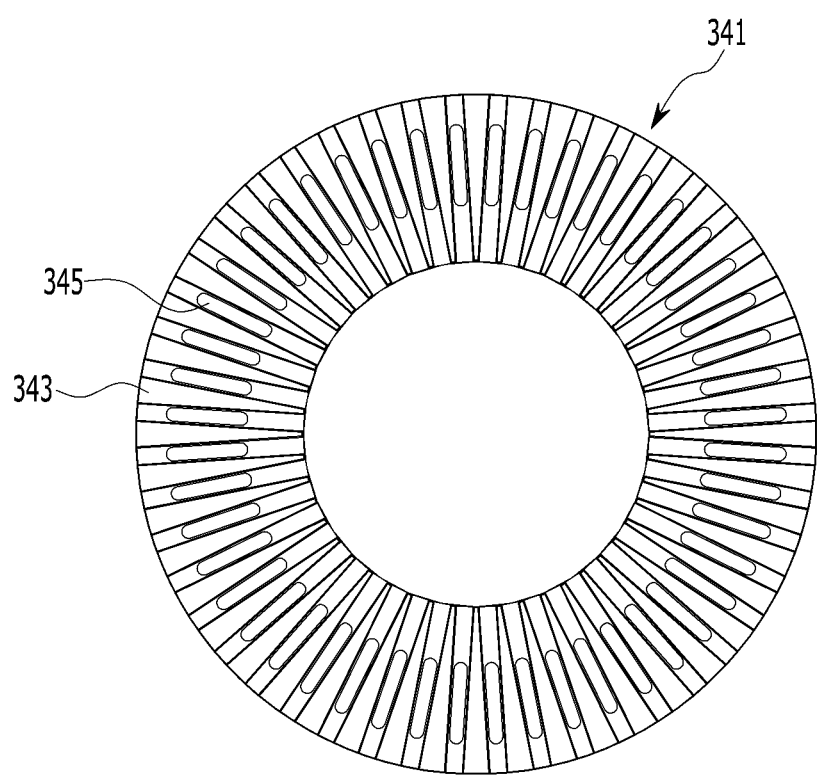
FIG. 9 is a plan view illustrating a guide disk of a coil fixing unit applied to a twisting device of a hair pin-type stator coil according to an exemplary embodiment of the present disclosure.

As shown in FIG. 9, the guide disk 341 includes a plurality of guide rails 343 and a plurality of guide rail holes 345.

The plurality of guide rails 343 are radially formed on the upper surface of the guide disk 341 in the radial direction. The plurality of guide rails 343 are disposed on the upper surface of the guide disk 341 to be spaced apart from each other at set intervals in a circumferential direction.

The plurality of guide rail holes 345 are respectively formed between the plurality of guide rails 343. The plurality of guide rail holes 345 is vertically connected to the plurality of cam follower slots 333 of the slot disk 331 and the plurality of cam follower rail grooves 325 of the support disk 321, respectively.

The plurality of coil fixing members 351 are configured to substantially fix the plurality of stator coils 7 in the layer direction. The plurality of coil fixing members 351 are radially slidably coupled to the guide disk 341.

Figure 10:
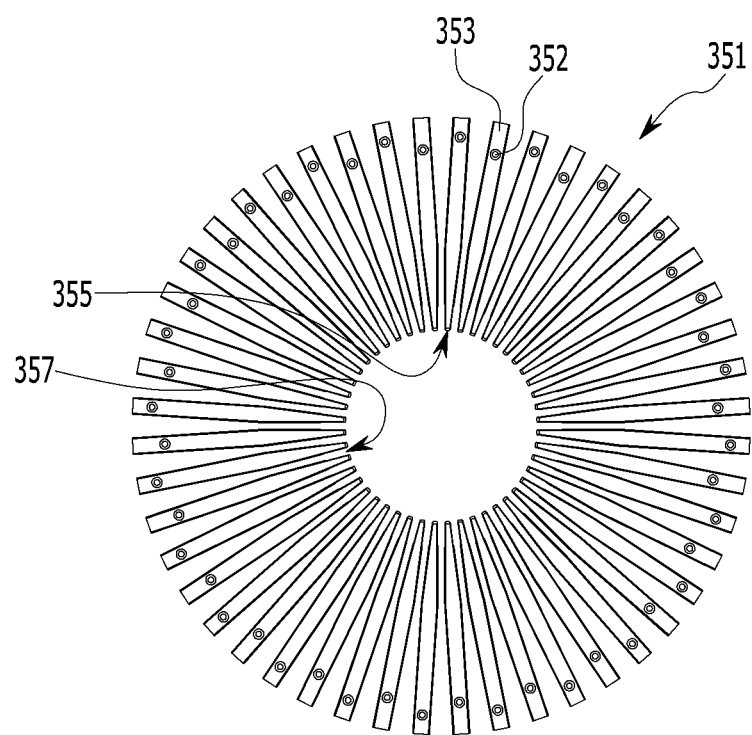
FIG. 10 is a plan view illustrating a plurality of coil fixing members of a coil fixing unit applied to a twisting device of a hair pin-type stator coil according to an exemplary embodiment of the present disclosure.

As shown in FIG. 10, each of the plurality of coil fixing members 351 includes a guide arm 353 and a guide finger 355.

The guide arm 353 is radially slidably coupled to the plurality of guide rails 343 of the guide disk 341. The guide finger 355 is integrally connected (extended) to the guide arm 353 to fix the plurality of stator coils 7 in the layer direction.

In the plurality of coil fixing members 351 as described above, coil guide passages 357 configured to fix the plurality of stator coils 7 in the layer direction are formed between the guide fingers 355, respectively.

Referring to FIGS. 5 and 6, the plurality of cam lobes 361 convert a rotational motion of the slot disk 331 into a linear motion of the plurality of coil fixing members 351 by the guide disk 341. The plurality of cam lobes 361 is also called a cam follower.

The plurality of cam lobes 361 may be fixed to the plurality of coil fixing members 351, respectively, and may penetrate through the guide disk 341 up and down to be coupled to the slot disk 331.

Each of the plurality of cam lobes 361 is fixed to a fixing hole 352 provided in each of the plurality of coil fixing members 351 and extends downward. The plurality of cam lobes 361 may vertically penetrate through the plurality of guide rail holes 345 of the guide disk 341 and the plurality of cam follower slots 333 of the slot disk 331 to be coupled to the plurality of cam follower rail grooves 325 of the support disk 321, respectively.

Referring to FIGS. 5 and 6, the actuator 371 generates a forward/backward operating force, converts the forward/backward operating force into a rotational force, and transmits the rotational force to the slot disk 331. That is, the actuator 371 is configured to rotate the slot disk 331 in both directions (e.g., clockwise and counterclockwise) by a set angle.

The actuator 371 is installed on the base plate 111 of the base frame 110 and is connected to the slot disk 331. The actuator 371 includes a working cylinder 372, a rail block 374, a sliding block 376, and a fixing pin 378.

The working cylinder 372 may be provided as a pneumatic or hydraulic cylinder well known to those skilled in the art. The working cylinder 372 is installed in a mounting block 373 mounted on the base plate 111.

Furthermore, the working cylinder 372 is operatively connected to an extension 335 extending in an outward direction from an outer edge of the slot disk 331. The working cylinder 372 includes a working rod 375 moving forward and backward by pneumatic or hydraulic pressure.

The rail block 374 is fixed to the mounting block 373. The rail block 374 is disposed in a direction of the forward and backward movement of the working rod 375. The sliding block 376 is connected to the working rod 375 of the working cylinder 372 and is slidably coupled to the rail block 374.

In addition, the fixing pin 378 is configured to operatively connect the sliding block 376 connected to the working rod 375 of the working cylinder 372 and the extension 335 of the slot disk 331.

The fixing pin 378 is fixed to an upper surface of the sliding block 376 and extends from the upper surface in an upward direction. The fixing pin 378 penetrates through the extension 335 of the slot disk 331 in a vertical direction.

Reference numeral 391 not described in FIGS. 5 and 6 denotes a cover fixed to the guide disk 341 and covering the upper surface of the plurality of coil fixing members 351.

Referring to FIGS. 2 to 4, in an exemplary embodiment of the present disclosure, the twisting tool unit 510 twist-form the welded portions 9 of the plurality of stator coils 7 in a state in which the plurality of stator coils 7 inserted into the stator core 3 are fixed by the coil fixing unit 310.

The twisting tool unit 510 is operatively connected to the tool driving unit 710 which will be described further below. The twisting tool unit 510 is installed to be vertically movable on the base plate 111 of the base frame 110 at the lower side of the coil fixing unit 310. The twisting tool unit 510 is disposed inside the disk hole 323 (see FIG. 7) of the support disk 321.

The twisting tool unit 510 is provided such that the welded portions 9 of the plurality of stator coils 7 of two adjacent layers, among a plurality of layers of the plurality of stator coils 7, are fitted and the two layers are rotated in different directions.

Figure 11:
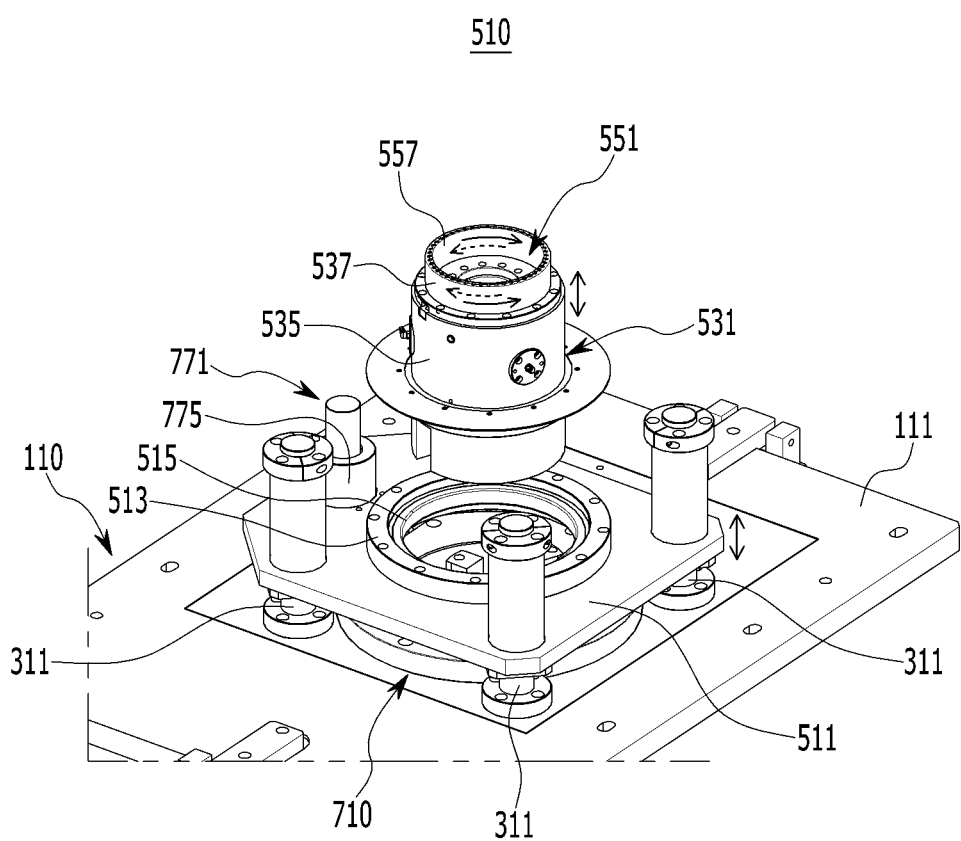
FIG. 11 is a perspective view illustrating a twisting tool unit applied to a twisting device of a hair pin-type stator coil according to an exemplary embodiment of the present disclosure.
Figure 12:
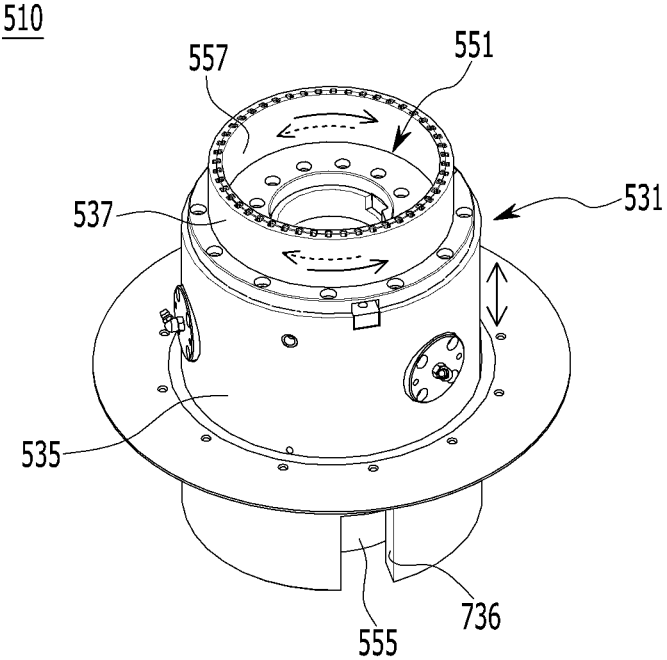
FIG. 12A is another perspective view illustrating a twisting tool unit applied to a twisting device of a hair pin-type stator coil according to an exemplary embodiment of the present disclosure.
FIG. 12B is another perspective view illustrating a twisting tool unit applied to a twisting device of a hair pin-type stator coil according to an exemplary embodiment of the present disclosure.
Figure 12:
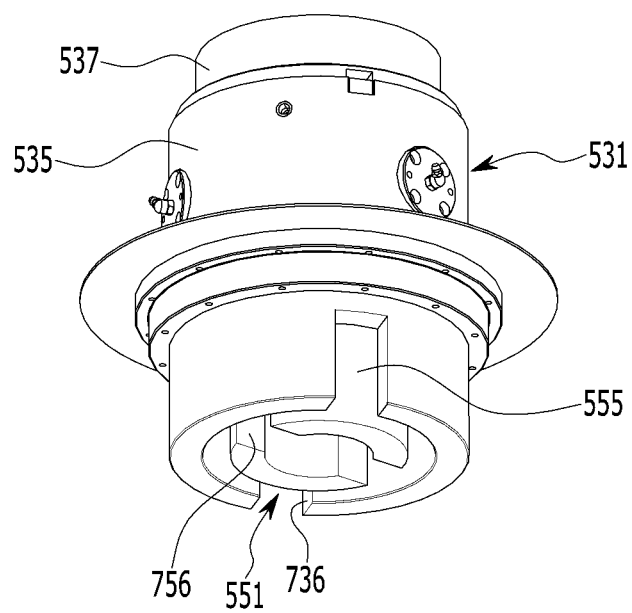
Figure 13:
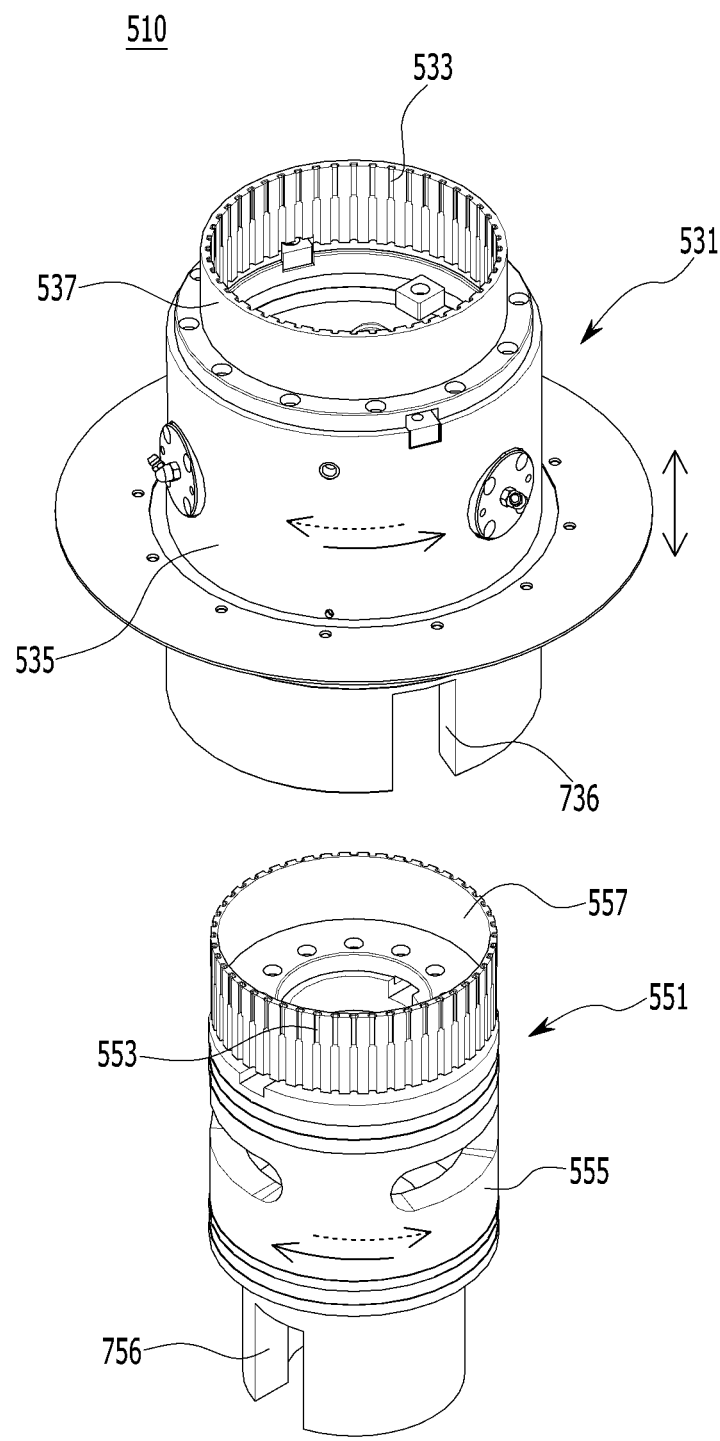
FIG. 13 is an exploded perspective view illustrating a twisting tool unit applied to a twisting device of a hair pin-type stator coil according to an exemplary embodiment of the present disclosure.
Figure 14:
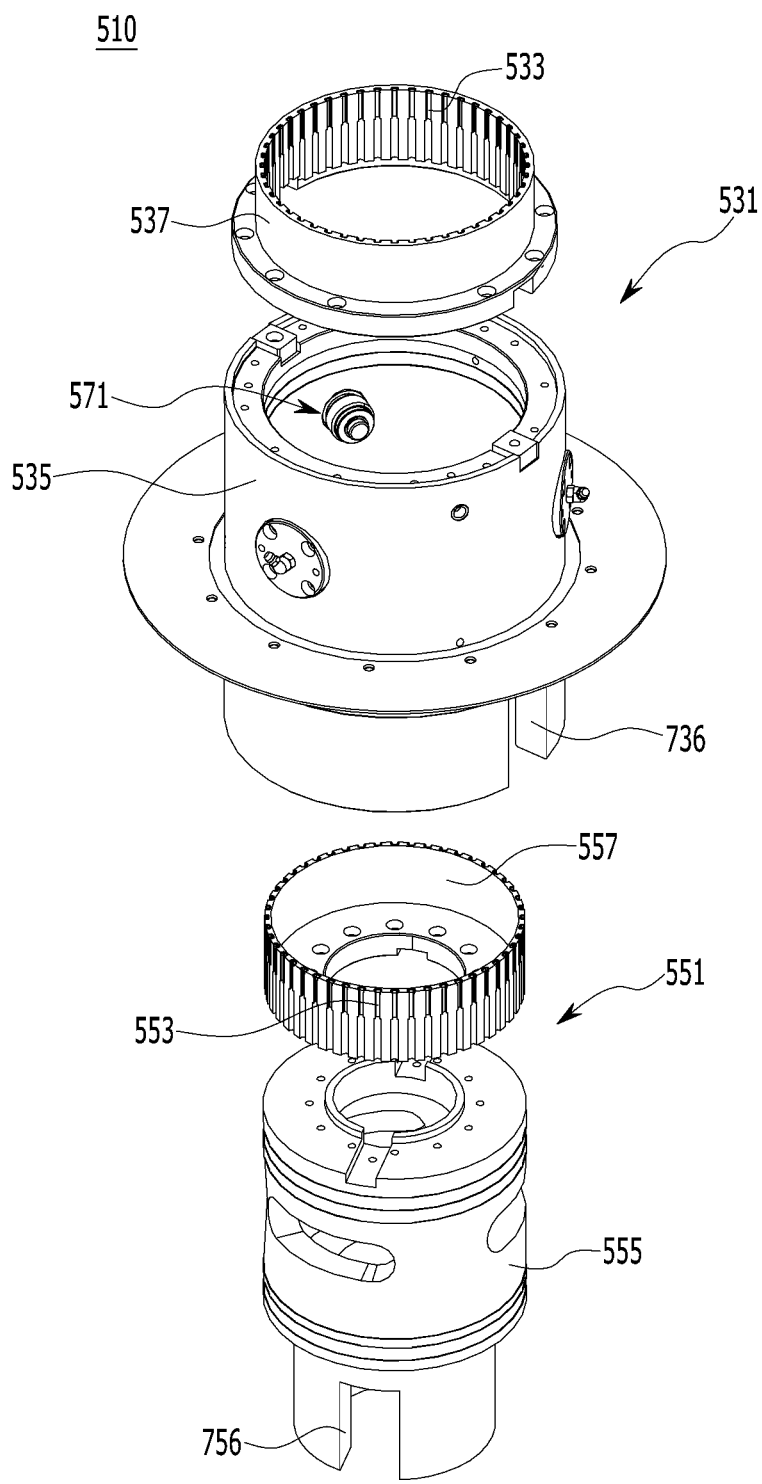
FIG. 14 is another exploded perspective view illustrating a twisting tool unit applied to a twisting device of a hair pin-type stator coil according to an exemplary embodiment of the present disclosure.

FIGS. 11 and 12A-B are combined perspective views illustrating a twisting tool unit applied to a twisting device of a hair pin-type stator coil according to an exemplary embodiment of the present disclosure, and FIGS. 13 and 14 are exploded perspective views showing a twisting tool unit applied to a twisting device of a hair pin-type stator coil according to an exemplary embodiment of the present disclosure.

Referring to FIGS. 2 to 4 and 11 to 14, the twisting tool unit 510 according to an exemplary embodiment of the present disclosure includes a lifting member 511, an outer twisting jig 531, and an inner twisting jig 551.

The lifting member 511 is operatively connected to the tool driving unit 710 which will be described further below. The lifting member 511 is coupled to the plurality of support rods 311 mentioned above to be movable in a vertical direction. In an example, the lifting member 511 is provided in the shape of a square plate, and a plurality of support rods 311 are vertically coupled to corners of the lifting member 511, respectively.

The outer twisting jig 531 is operatively connected to the tool driving unit 710 to be described further below and is rotatably installed on the lifting member 511. The outer twisting jig 531 is rotatably on the lifting member 511 by a fixing ring 513 fixed to an upper surface of the lifting member 511 and a bush ring 515 fixed to the fixing ring 513. Here, the outer twisting jig 531 is rotatably coupled to the bush ring 515.

A plurality of first coil insertion grooves 533 are formed to be spaced apart from each other in the outer twisting jig 531 in a circumferential direction. The welded portions 9 of the plurality of stator coils 7 of a radially outer layer, among two adjacent layers of the plurality of stator coils 7, may be inserted into the plurality of first coil insertion grooves 533. The outer twisting jig 531 includes a first jig body 535 and a first crown member 537.

The first jig body 535 is provided in a cylindrical shape and is rotatably coupled to the bush ring 515. The first crown member 537 is coupled to an upper end of the first jig body 535. A plurality of first coil insertion grooves 533 are formed at an upper end of the first crown member 537.

The plurality of first coil insertion grooves 533 are disposed to be spaced apart from each other on an inner circumferential surface of an upper end portion of the first crown member 537 in a circumferential direction. The plurality of first coil insertion grooves 533 are formed in the vertical direction on the inner circumferential surface of the upper end portion of the first crown member 537 and are connected to the upper end of the first crown member 537.

The inner twisting jig 551 is operatively connected to a tool driving unit 710 which will be described further below. The inner twisting jig 551 is rotatably installed inside the outer twisting jig 531 in a direction opposite to a rotational direction of the outer twisting jig 531.

A plurality of second coil insertion grooves 553 are formed to be spaced apart from each other on the inner twisting jig 551 in a circumferential direction. The welded portions 9 of the plurality of stator coils 7 of a layer positioned inside in a radial direction, among two adjacent layers of the plurality of stator coils 7, may be inserted into the plurality of second coil insertion grooves 553. The inner twisting jig 551 includes a second jig body 555 and a second crown member 557.

The second jig body 555 is provided in a cylindrical shape. The second crown member 557 is coupled to an upper end portion of the second jig body 555. A plurality of second coil insertion grooves 553 are formed at an upper end portion of the second crown member 557.

The plurality of second coil insertion grooves 553 are disposed to be spaced apart from each other in a circumferential direction on the outer circumferential surface of the upper end portion of the second crown member 557. The plurality of second coil insertion grooves 553 are formed in a vertical direction on an outer circumferential surface of the upper end portion of the second crown member 557 and are connected to the upper end of the second crown member 557.

Figure 15:
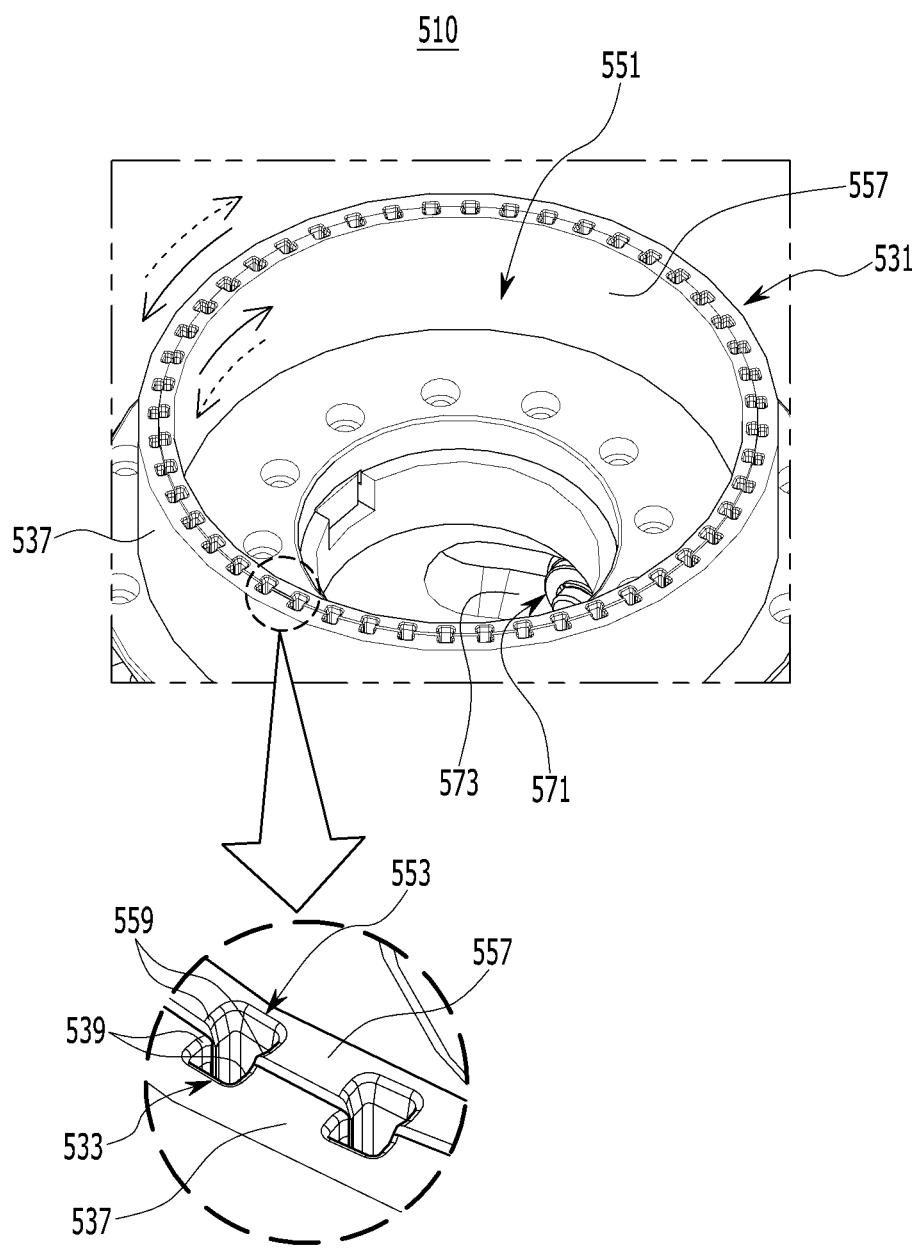
FIG. 15 is a view illustrating a first crown member and a second crown member applied to a twisting tool unit of a twisting device for a hair pin-type stator coil according to an exemplary embodiment of the present disclosure.

Here, as shown in FIG. 15, the inner circumferential surface of the first crown member 537 and the outer circumferential surface of the second crown member 557 as described above are in contact with each other. In addition, the first coil insertion grooves 533 and the plurality of second coil insertion grooves 553 face each other, respectively.

Furthermore, the outer twisting jig 531 as described above includes a first edge protrusion 539 formed on the first crown member 537. The first edge protrusion 539 is formed at an opening end of each of the plurality of first coil insertion grooves 533.

In addition, the inner twisting jig 551 as described above includes a second edge protrusion 559 formed at the second crown member 557. The second edge protrusion 559 is formed at an opening end of each of the plurality of second coil insertion grooves 553.

The first edge protrusion 539 and the second edge protrusion 559 are configured to constrain the welded portions 9 of the plurality of stator coils 7 respectively fitted into the plurality of first coil insertion grooves 533 and the plurality of second coil insertion grooves 553.

Meanwhile, the outer twisting jig 531 and the inner twisting jig 551 as described above may be coupled to each other so as to be moved in a vertical direction by the lifting member 511.

Figure 16:
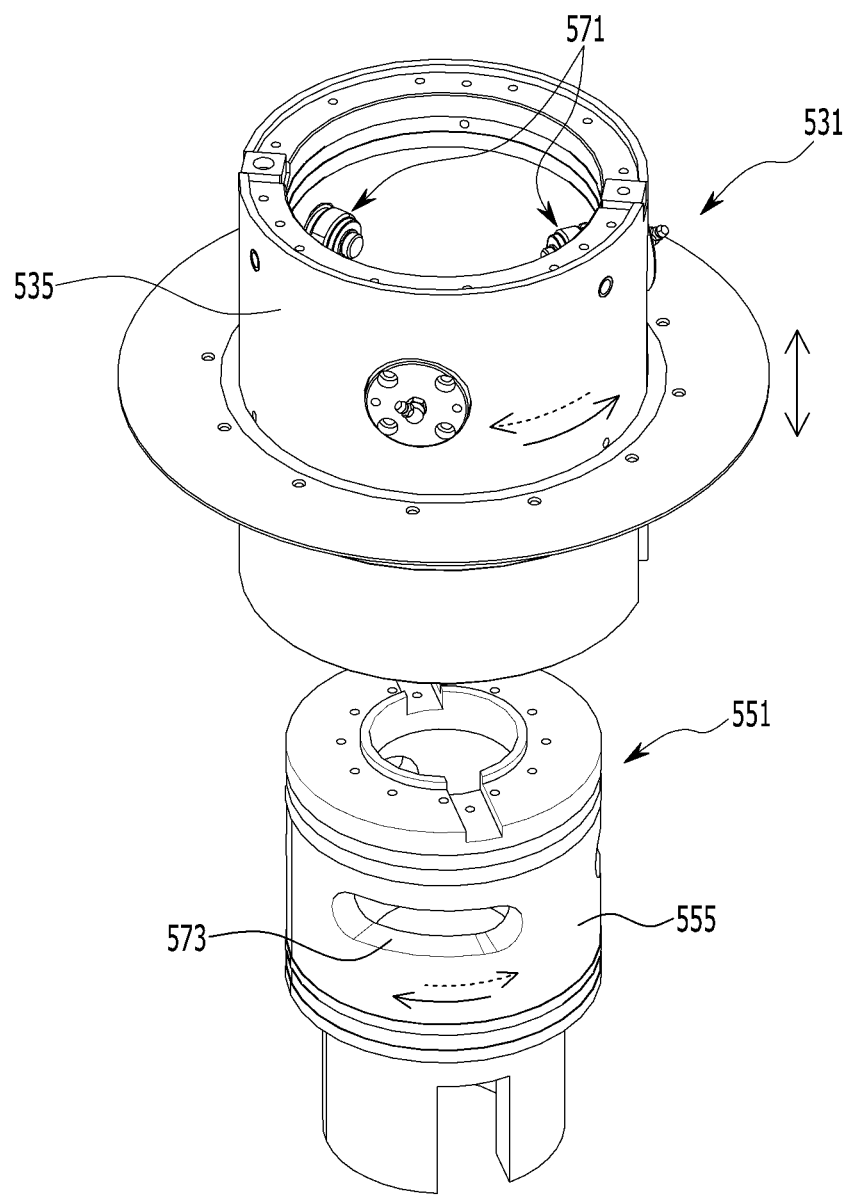
FIG. 16 is a view illustrating a cam follower coupling structure of a twisting tool unit applied to a twisting device of a hair pin-type stator coil according to an exemplary embodiment of the present disclosure.
Figure 17:
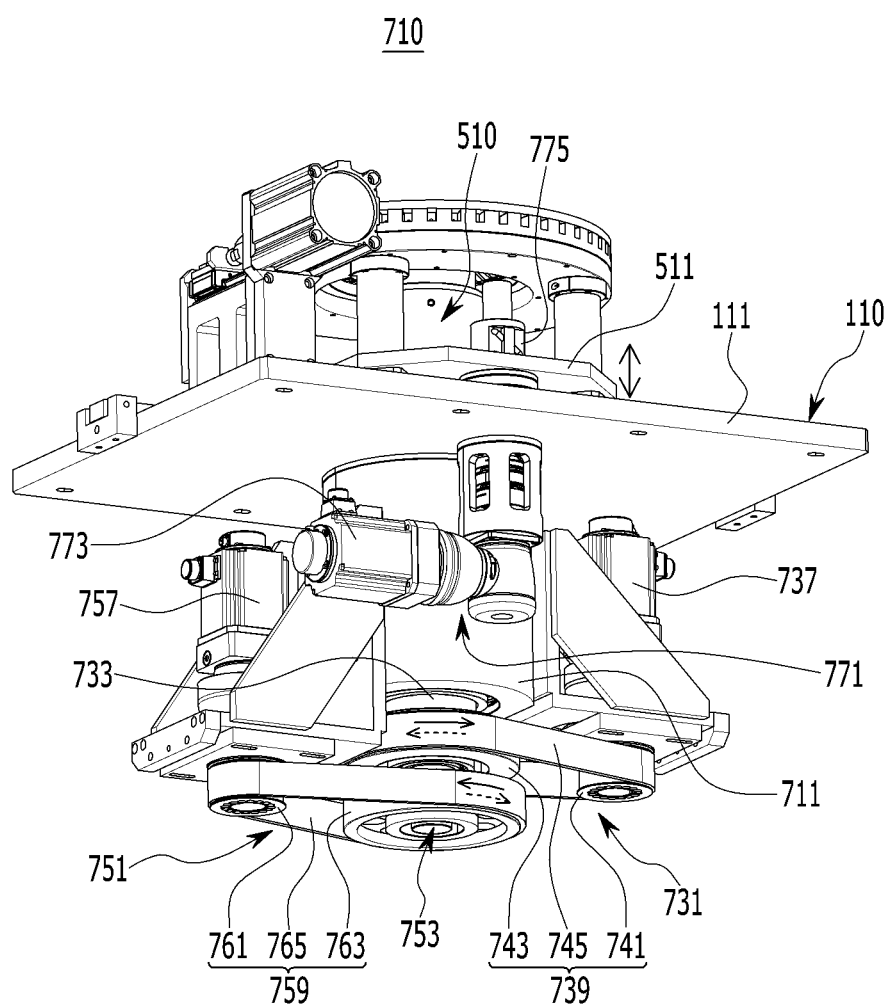
FIG. 17 is a perspective view illustrating a tool driving unit applied to a twisting device of a hair pin-type stator coil according to an exemplary embodiment of the present disclosure.
Figure 18:
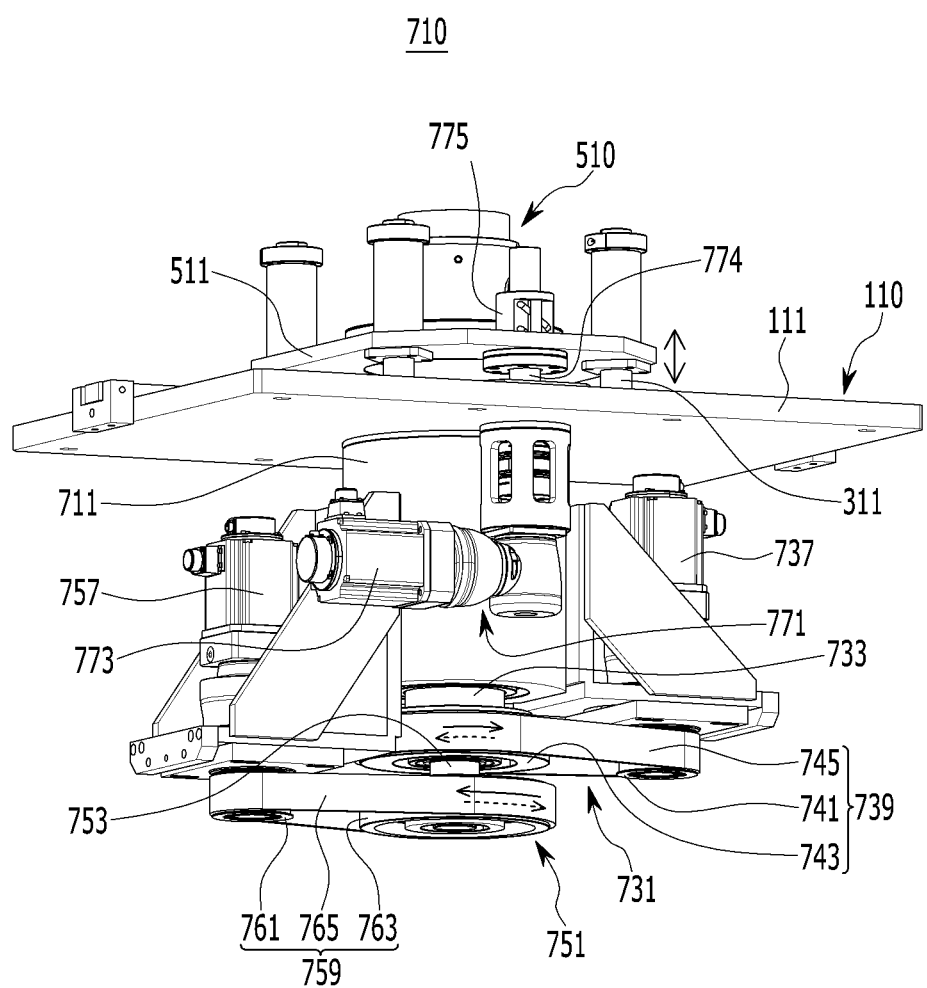
FIG. 18 is another perspective view illustrating a tool driving unit applied to a twisting device of a hair pin-type stator coil according to an exemplary embodiment of the present disclosure.

To this end, as shown in FIG. 16, the twisting tool unit 510 further includes at least one cam follower 571 fixed to the outer twisting jig 531 and coupled to the inner twisting jig 551 to be contactable to a cam.

The at least one cam follower 571 is fixed to the first jig body 535 of the outer twisting jig 531. The at least one cam follower 571 is coupled to a cam slot 573 inclined in a circumferential direction on the second jig body 555 of the inner twisting jig 551.

Accordingly, the outer twisting jig 531 as described above may be moved in a vertical direction by the cam follower 571 by a set inclination angle of the at least one cam slot 573. Here, the outer twisting jig 531 is supported to be movable up and down by the bush ring 515 (see FIG. 11) mentioned above.

Referring to FIGS. 2 to 4, in the exemplary embodiment of the present disclosure, the tool driving unit 710 operates the twisting tool unit 510. The tool driving unit 710 is installed on the base frame 110 and is operatively connected to the twisting tool unit 510.

The tool driving unit 710 is operatively connected to each of the outer twisting jig 531 and the inner twisting jig 551 of the tool driving unit 710 as shown in FIG. 11 and rotates the outer twisting jig 531 and the inner twisting jig 551 in opposite directions.

In addition, the tool driving unit 710 is operatively connected to the lifting member 511 of the twisting tool unit 510 as shown in FIG. 11 and may move the lifting member 511 in a vertical direction.

FIGS. 17 to 19B are views illustrating a tool driving unit applied to a twisting device of a hair pin-type stator coil according to an exemplary embodiment of the present disclosure.

Referring to FIGS. 2 to 4 and FIGS. 17 to 19B, the tool driving unit 710 according to an exemplary embodiment of the present disclosure includes a housing 711, a first jig operating unit 731, a second jig operating unit 751, and a lift driving unit 771.

The housing 711 is configured as a cylindrical housing in which an upper end corresponding to the twisting tool unit 510 is open and a lower end corresponding to the upper end is closed. The housing 711 is fixed to the base plate 111 of the base frame 110 through the upper end portion.

The first jig operating unit 731 is operatively connected to the outer twisting jig 531. The first jig operating unit 731 includes an outer shaft 733, a first key adapter 735, a first servo motor 737, and a first power transmission mechanism 739.

The outer shaft 733 is rotatably installed inside the housing 711 and is operatively connected to the outer twisting jig 531. In an example, the outer shaft 733 is provided in a cylindrical shape and is rotatably supported on an inner circumferential surface of the housing 711 through a bearing 734.

The first key adapter 735 is fixed to an upper end portion of the outer shaft 733 and is key-coupled to the outer twisting jig 531 in a vertical direction. In an example, the first key adapter 735 is provided in a ring shape.

The first key adapter 735 includes at least one first key 738 coupled to at least one first key recess 736 formed at a lower end portion of the first jig body 535 of the outer twisting jig 531.

The first servo motor 737 is configured as a motor servo-controlled in rotation speed and direction and is installed in the housing 711.

The first power transmission mechanism 739 is configured to transmit rotational power of the first servo motor 737 to the outer twisting jig 531. The first power transmission mechanism 739 includes a first driving pulley 741, a first driven pulley 743, and a first belt 745.

The first driving pulley 741 is connected to an output shaft of the first servo motor 737. The first driven pulley 743 is connected to a lower end portion of the outer shaft 733. In addition, the first belt 745 connects the first driving pulley 741 to the first driven pulley 743.

The second jig operating unit 751 is operatively connected to the inner twisting jig 551. The second jig operating unit 751 includes an inner shaft 753, a second key adapter 755, a second servo motor 757, and a second power transmission mechanism 759.

The inner shaft 753 is rotatably installed inside the outer shaft 733 and is operatively connected to the inner twisting jig 551. In an example, the inner shaft 753 is provided in a cylindrical shape, and is rotatably supported on an inner circumferential surface of the outer shaft 733 through a bearing (not shown).

The second key adapter 755 is fixed to an upper end portion of the inner shaft 753 inside the first key adapter 735, and is key-coupled to the inner twisting jig 551 in a vertical direction. In an example, the second key adapter 755 is provided in a circular block shape.

The second key adapter 755 includes at least one second key 758 coupled to at least one second key recess 756 formed at a lower end portion of the second jig body 555 of the inner twisting jig 551.

The second servo motor 757 is configured as a motor servo-controlled in rotation speed and direction and is installed in the housing 711.

The second power transmission mechanism 759 is configured to transmit rotational power of the second servo motor 757 to the inner twisting jig 551. The second power transmission mechanism 759 includes a second driving pulley 761, a second driven pulley 763, and a second belt 765.

The second driving pulley 761 is connected to an output shaft of the second servo motor 757. The second driven pulley 763 is connected to a lower end portion of the inner shaft 753. In addition, the second belt 765 connects the second driving pulley 761 to the second driven pulley 763.

The lift driving unit 771 is installed in the housing 711 and is operatively connected to the lifting member 511. The lift driving unit 771 includes a third servo motor 773 and a nut block 775.

The third servo motor 773 is configured as a motor servo-controlled in rotation speed and direction and is installed in the housing 711. In addition, the nut block 775 is fixed to the lifting member 511 and is screw-coupled to a motor shaft 774 of the third servo motor 773 in a vertical direction.

Hereinafter, the operation and action of the twisting device 100 of a hair pin-type stator coil according to the exemplary embodiment of the present disclosure configured as described above will be described in detail with reference to FIGS. 1 to 19B.

First, in an exemplary embodiment of the present disclosure, the core gripper 101 grips the stator core 3 in which a plurality of stator coils 7 are inserted in a plurality of layers in a plurality of slots 5 and transfers the stator core 3 to a set location. In this case, the stator core 3 may be located above the coil fixing unit 310.

Here, the plurality of coil fixing members 351 of the coil fixing unit 310 has been moved radially backward along the plurality of guide rails 343 of the guide disk 341 by driving of the actuator 371. Here, the working cylinder 372 of the actuator 371 has moved the working rod 375 forward, and accordingly, the slot disk 331 is in a state of being rotated in one direction.

In addition, the outer twisting jig 531 of the twisting tool unit 510 is coupled to the cam slot 573 of the inner twisting jig 551 through at least one cam follower 571.

Furthermore, the lifting member 511 of the twisting tool unit 510 has been moved downward together with the outer twisting jig 531 and the inner twisting jig 551 by driving of the lift driving unit 771 of the tool driving unit 710.

Furthermore, the plurality of first coil insertion grooves 533 of the outer twisting jig 531 and the plurality of second coil insertion grooves 553 of the inner twisting jig 551 face each other in a state in which the inner circumferential surface of the first crown member 537 and the outer circumferential surface of the second crown member 557 are in contact with each other.

In such a state, the stator core 3 is moved downward by the core gripper 101 moved by a robot motion of the robot 103.

Then, the welded portions 9 of the plurality of stator coils 7 of two set adjacent layers, among the plurality of layers of the plurality of stator coils 7, are inserted into the plurality of first coil insertion grooves 533 and the plurality of second coil insertion grooves 553, respectively, for each layer.

In an example, the welded portions 9 of the plurality of stator coils 7 of any one of the two layers located radially outside the stator core 3 are inserted into the plurality of first coil insertion grooves 533 of the outer twisting jig 531. Also, the welded portions 9 of the plurality of stator coils 7 of the other layer located radially inside the stator core 3, among the two layers, are inserted into the plurality of second coil insertion grooves 553 of the inner twisting jig 551.

Next, the working cylinder 372 of the actuator 371 moves the working rod 375 backward. Accordingly, the sliding block 376 connected to the working rod 375 moves backward along the rail block 374. Then, since the fixing pin 378 fixed to the sliding block 376 penetrates vertically through the extension 335 of the slot disk 331, the slot disk 331 rotates by a set angle in the other direction.

When the slot disk 331 rotates in the other direction as described above, the plurality of coil fixing members 351 moves forward radially along the plurality of guide rails 343 of the guide disk 341 by the plurality of cam lobes 361.

Here, the plurality of cam lobes 361 may move the plurality of coil fixing members 351 forward, while sliding along the plurality of cam follower slots 333 of the slot disk 331 and the plurality of cam follower rail grooves 325 of the support disk 321 through the plurality of guide rail holes 345 of the guide disk 341.

Accordingly, the plurality of coil fixing members 351 fix the plurality of stator coils 7 in a layer direction through the coil guide passage 357 between the guide fingers 355.

Thereafter, the first servo motor 737 of the first jig operating unit 731 of the tool driving unit 710 is driven, and rotational power of the first servo motor 737 is transmitted to the outer shaft 733 through the first power transmission mechanism 739. Accordingly, the outer shaft 733 rotates in one direction.

Here, the first key adapter 735 of the first jig operating unit 731 is fixed to the upper end portion of the outer shaft 733. In addition, at least one first key 738 of the first key adapter 735 is coupled to at least one first key recess 736 of the outer twisting jig 531 in the vertical direction.

Accordingly, when the outer shaft 733 rotates in one direction, the outer twisting jig 531 is rotated in one direction by the first key adapter 735.

During this process, the second servo motor 757 of the second jig operating unit 751 of the tool driving unit 710 is driven, and rotational power of the second servo motor 757 is transferred to the inner shaft 753 through the second power transmission mechanism 759. Accordingly, the inner shaft 753 rotates in the other direction opposite to the rotation direction of the outer shaft 733.

Here, the second key adapter 755 of the second jig operating unit 751 is fixed to an upper end portion of the inner shaft 753. In addition, at least one second key 758 of the second key adapter 755 is coupled to at least one second key recess 756 of the inner twisting jig 551 in a vertical direction.

Accordingly, when the inner shaft 753 rotates in the other direction, the inner twisting jig 551 is rotated in the other direction by the second key adapter 755.

Accordingly, in a state in which the welded portions 9 of the plurality of stator coils 7 are respectively inserted into the plurality of first coil insertion grooves 533 and the plurality of second coil insertion grooves 553 for each of two layers, the outer twisting jig 531 and the inner twisting jig 551 rotate in opposite directions to twist-form the welded portions 9 of the plurality of stator coils 7.

In the process of twist-forming the welded portions 9 of the plurality of stator coils 7 as described above, the plurality of first coil insertion grooves 533 and the welded portions 9 of the plurality of stator coils 7 inserted into the plurality of second coil insertion grooves 553 are lifted.

Accordingly, the lifting member 511 is moved upwardly through the nut block 775, while driving the third servo motor 773 of the lift driving unit 771. Then, the outer twisting jig 531 and the inner twisting jig 551 move upward together with the lifting member 511.

Accordingly, the outer twisting jig 531 and the inner twisting jig 551 are moved upward, thereby correcting fixed positions of the welded portions 9 and twisting the welded portions 9.

Furthermore, in the process of twist-forming the welded portions 9 as described above, the outer twisting jig 531 may be moved upwardly by a set inclination angle of the at least one cam slot 573 by the cam follower 571 coupled to at least one cam slot 573 of the inner twisting jig 551.

The reason for moving the outer twisting jig 531 in the upward direction is that a distance from the center of the outer twisting jig 531 to the welded portions 9 inserted into the plurality of first coil insertion grooves 533 is greater than a distance from the center of the inner twisting jig 551 to the welded portions 9 inserted into the plurality of second coil insertion grooves 553.

Accordingly, the outer twisting jig 531 moves to a location higher than a height of the inner twisting jig 551, and the fixing positions of the welded portions 9 inserted into the plurality of first coil insertion grooves 533 may be corrected.

Meanwhile, after the welded portions 9 of the plurality of stator coils 7 of the two set layers are twist-formed through the process as described above, the outer twisting jig 531 and the inner twisting jig 551 are returned to the original positions by the operation of the tool driving unit 710.

Thereafter, the plurality of coil fixing members 351 move forward radially along the plurality of guide rails 343 of the guide disk 341 by driving of the actuator 371.

Finally, the core gripper 101 moves the stator core 3 upward by the robot motion of the robot 103, and transfers the stator core 3 to the coil welding process, which is a subsequent process.

Meanwhile, the welded portions 9 of the plurality of stator coils 7 of the remaining layers, except for the two layers on which the twist forming is completed, among the plurality of layers of the plurality of stator coils 7, may be twist-formed through the twisting device 100 of a hair pin-type stator coil according to an exemplary embodiment of the present disclosure.

The twisting device 100 of a hair pin-type stator coil according to an exemplary embodiment of the present disclosure as described so far may twist-form the welded portions 9 of the plurality of stator coils 7 of two set layers among the plurality of layers.

In an example, the twisting devices 100 of a hair pin-type stator coil according to an exemplary embodiment of the present disclosure may be arranged in series to twist-form the welded portions 9 of the plurality of stator coils 7 of two set layers, among the plurality of layers.

Thus, the twisting device 100 of a hair pin-type stator coil according to an exemplary embodiment of the present disclosure has a simple structure, unlike a complicated structure of twist-forming the welded portions 9 of the plurality of stator coils 7 of the entirety of the plurality of layers.

Therefore, the twisting device 100 of a hair pin-type stator coil according to an exemplary embodiment of the present disclosure may lower the equipment cost, is advantageous in terms of maintenance, and is convenient for replacing a tool when changing a model of the stator.

While the present disclosure has been described in connection with what is presently considered to be practical exemplary embodiments, it is to be understood that the present disclosure is not limited to the disclosed exemplary embodiments. On the contrary, it is intended to cover various modifications and equivalent arrangements included within the spirit and scope of the appended claims.

What is claimed is:
1. A twisting device of a hair pin-type stator coil for twist-forming a plurality of hair pin-type stator coils inserted into a plurality of layers in a stator core, the twisting device comprising:
a base frame;

a coil fixing unit installed on the base frame through a plurality of support rods;

a twisting tool unit allowing a plurality of stator coils of two adjacent layers, among the plurality of layers, to be inserted thereinto, the two layers being rotated in different directions, and installed to be movable up and down in the base frame on a lower side of the coil fixing unit; and a tool driving unit installed on the base frame and operatively connected to the twisting tool unit.

2. The twisting device of claim 1, wherein:
the coil fixing unit includes
a plurality of coil fixing members operatively connected to an actuator installed on the base frame and radially reciprocating by the actuator.

3. The twisting device of claim 2, wherein:
the coil fixing unit includes
a coil guide passage formed between the plurality of coil fixing members to fix the plurality of stator coils in a layer direction.

4. The twisting device of claim 1, wherein the coil fixing unit comprises:
a support disk disposed to be spaced apart from an upper surface of the base frame through the plurality of support rods with the twisting tool unit on an inner side;
a slot disk rotatably coupled to the support disk;
a guide disk fixed to the support disk with the slot disk at a lower side,
a plurality of coil fixing members radially slidably coupled to the guide disk;
a plurality of cam lobes fixed to the plurality of coil fixing members and coupled to the slot disk through the guide disk; and
an actuator installed on the base frame and connected to the slot disk.

5. The twisting device of claim 4, wherein:
the support disk includes a plurality of cam follower rail grooves radially formed on an upper surface of the support disk,
the slot disk includes a plurality of cam follower slots, such that the plurality of cam follower slots are formed as slot holes curved from an inner edge end of the slot disk toward an outer edge end of the slot disk, and
the guide disk includes a plurality of guide rails radially formed on an upper surface thereof, and a plurality of guide rail holes formed between the plurality of guide rails.

6. The twisting device of claim 5, wherein
the plurality of cam lobes are configured to vertically penetrate through the plurality of guide rail holes and the plurality of cam follower slots are configured to be coupled to the plurality of cam follower rail grooves.

7. The twisting device of claim 5, wherein each of the plurality of coil fixing members includes:
a guide arm configured to be slidably coupled to the plurality of guide rails; and
a guide finger integrally connected to the guide arm is configured to fix the plurality of stator coils in the layer direction.

8. The twisting device of claim 4, wherein the actuator includes:
a working cylinder installed on a mounting block mounted on the base frame and operably connected to an extension extending outwardly from an edge of the slot disk;
a rail block fixed to the mounting block;

a sliding block connected to a working rod of the working cylinder and slidably coupled to the rail block; and
a fixing pin fixed to the sliding block and penetrating through the extension up and down.

9. The twisting device of claim 1, wherein the twisting tool unit includes:
a lifting member movably coupled to the plurality of support rods in a vertical direction;
a cylindrical outer twisting jig rotatably coupled to the lifting member and having a plurality of first coil insertion grooves formed to be spaced apart from each other in a circumferential direction; and
a cylindrical inner twisting jig rotatably installed on an inner side of the outer twisting jig in a direction opposite to a rotation direction of the outer twisting jig, and having a plurality of second coil insertion grooves formed to be spaced apart from each other in the circumferential direction.

10. The twisting device of claim 9, wherein the outer twisting jig and the inner twisting jig are coupled to each other so as to be moved in a vertical direction by the lifting member.

11. The twisting device of claim 9, wherein the twisting tool unit further includes a cam follower fixed to the outer twisting jig and coupled to at least one cam slot formed to be inclined in the circumferential direction on the inner twisting jig.

12. The twisting device of claim 11, wherein the outer twisting jig is configured to move in a vertical or upward direction along a set inclination angle of the at least one cam slot.

13. The twisting device of claim 9, wherein:
the outer twisting jig includes a first crown member in which the plurality of first coil insertion grooves are formed on an inner circumferential surface in a vertical direction;
the inner twisting jig includes a second crown member in which the plurality of second coil insertion grooves are formed on an outer circumferential surface in a vertical direction; and
the inner circumferential surface of the first crown member and the outer circumferential surface of the second crown member are in contact with each other, and the plurality of first coil insertion grooves and the plurality of second coil insertion grooves face each other, respectively.

14. The twisting device of claim 9, wherein:
the outer twisting jig includes a first edge protrusion formed at an open end of the plurality of first coil insertion grooves; and
the inner twisting jig includes a second edge protrusion formed at an open end of the plurality of second coil insertion grooves.

15. The twisting device of claim 9, wherein the tool driving unit includes:
a housing fixed to the base frame;
a first jig operating unit including an outer shaft rotatably installed inside the housing and operably connected to the outer twisting jig through the outer shaft; and
a second jig operating unit including an inner shaft rotatably installed inside the outer shaft and operably connected to the inner twisting jig through the inner shaft.

16. The twisting device of claim 15, wherein the tool driving unit further includes a lift driving unit installed in the housing and connected to the lifting member.

17. The twisting device of claim 16, wherein the lift driving unit includes:
  a third servo motor installed in the housing; and
  a nut block fixed to the lifting member and screw-coupled to a motor shaft of the third servo motor.

18. The twisting device of claim 15, wherein the first jig operating unit includes:
  a first key adaptor fixed to an upper end portion of the outer shaft and key-coupled to the outer twisting jig;
  a first servo motor installed in the housing; and
  a first power transmission mechanism including a first driving pulley connected to the first servo motor, a first driven pulley connected to the outer shaft, and a first belt connecting the first driving pulley to a second driven pulley.

19. The twisting device of claim 18, wherein the second jig operating unit includes:
  a second key adapter fixed to an upper end portion of the inner shaft and key-coupled to the inner twisting jig;
  a second servo motor installed in the housing; and
  a second power transmission mechanism including a second driving pulley connected to the second servo motor, a second driven pulley connected to the inner shaft, and a second belt connecting the second driving pulley to the second driven pulley.

20. The twisting device of claim 19, wherein:
  the first key adapter includes at least one first key coupled to at least one first key recess formed at a lower end of the outer twisting jig; and
  the second key adapter includes at least one second key coupled to at least one second key recess formed at a lower end of the inner twisting jig.

* * * * *